United States Patent
Zadeh et al.

(10) Patent No.: US 11,074,455 B2
(45) Date of Patent: *Jul. 27, 2021

(54) MACHINE LEARNING IN VIDEO CLASSIFICATION

(71) Applicant: Matroid, Inc., Palo Alto, CA (US)

(72) Inventors: Reza Zadeh, Emerald Hills, CA (US); Dong Wang, San Jose, CA (US); Deepak Menghani, Mountain View, CA (US); John Goddard, Mountain View, CA (US); Ryan Tobin, Sacramento, CA (US)

(73) Assignee: Matroid, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,843

(22) Filed: Apr. 15, 2020

(65) Prior Publication Data
US 2020/0242364 A1 Jul. 30, 2020

Related U.S. Application Data

(63) Continuation of application No. 15/905,710, filed on Feb. 26, 2018, now Pat. No. 10,671,852.
(Continued)

(51) Int. Cl.
*G06F 3/00* (2006.01)
*G06K 9/00* (2006.01)
(Continued)

(52) U.S. Cl.
CPC ........... *G06K 9/00718* (2013.01); *G06F 3/00* (2013.01); *G06F 16/24578* (2019.01);
(Continued)

(58) Field of Classification Search
None
See application file for complete search history.

(56) References Cited

U.S. PATENT DOCUMENTS

| 8,238,669 B2 * | 8/2012 | Covell | G06K 9/00758 382/224 |
| 8,401,252 B2 * | 3/2013 | Schneiderman | G11B 27/28 382/118 |

(Continued)

OTHER PUBLICATIONS

United States Office Action, U.S. Appl. No. 15/905,710, dated Oct. 3, 2019, 11 pages.

*Primary Examiner* — Maikhanh Nguyen
(74) *Attorney, Agent, or Firm* — Fenwick & West LLP

(57) ABSTRACT

Described herein are systems and methods that search videos and other media content to identify items, objects, faces, or other entities within the media content. Detectors identify objects within media content by, for instance, detecting a predetermined set of visual features corresponding to the objects. Detectors configured to identify an object can be trained using a machine learned model (e.g., a convolutional neural network) as applied to a set of example media content items that include the object. The systems provide user interfaces that allow users to review search results, pinpoint relevant portions of media content items where the identified objects are determined to be present, review detector performance and retrain detectors, providing search result feedback, and/or reviewing video monitoring results and analytics.

17 Claims, 22 Drawing Sheets

Related U.S. Application Data

(60) Provisional application No. 62/465,788, filed on Mar. 1, 2017, provisional application No. 62/465,790, filed on Mar. 1, 2017.

(51) Int. Cl.

| | |
|---|---|
| *G06K 9/62* | (2006.01) |
| *G11B 27/34* | (2006.01) |
| *G11B 27/36* | (2006.01) |
| *G06F 16/74* | (2019.01) |
| *G06F 16/783* | (2019.01) |
| *G06F 16/2457* | (2019.01) |
| *G06F 16/738* | (2019.01) |
| *G06F 3/0484* | (2013.01) |

(52) U.S. Cl.
 CPC ............ *G06F 16/738* (2019.01); *G06F 16/74* (2019.01); *G06F 16/7837* (2019.01); *G06K 9/6268* (2013.01); *G11B 27/34* (2013.01); *G11B 27/36* (2013.01); *G06F 3/0484* (2013.01)

(56) References Cited

U.S. PATENT DOCUMENTS

| | | |
|---|---|---|
| 8,599,316 B2 | 12/2013 | Deever |
| 8,654,255 B2 | 2/2014 | Hua et al. |
| 8,983,192 B2 | 3/2015 | Sukthankar et al. |
| 9,253,511 B2 | 2/2016 | Chen et al. |
| 9,319,745 B2 | 4/2016 | Rankine |
| 9,646,227 B2 * | 5/2017 | Suri ........................ G06T 7/20 |
| 9,767,363 B2 * | 9/2017 | Birkbeck ................. G06K 9/52 |
| 9,953,222 B2 | 4/2018 | Shetty et al. |
| 9,955,196 B2 | 4/2018 | Ioffe |
| 10,062,412 B2 * | 8/2018 | Liu ..................... G11B 27/031 |
| 10,834,436 B2 * | 11/2020 | Smith .................. H04N 21/251 |
| 2007/0263128 A1 | 11/2007 | Zhang |
| 2008/0019669 A1 | 1/2008 | Girshick et al. |
| 2009/0079871 A1 | 3/2009 | Hua et al. |
| 2009/0092375 A1 | 4/2009 | Berry et al. |
| 2010/0045799 A1 | 2/2010 | Lei et al. |
| 2011/0170749 A1 * | 7/2011 | Schneiderman ..... G08B 13/196 382/118 |
| 2011/0292288 A1 | 12/2011 | Deever |
| 2013/0114902 A1 | 5/2013 | Sukthankar et al. |
| 2015/0106856 A1 | 4/2015 | Rankine |
| 2015/0296228 A1 | 10/2015 | Chen et al. |
| 2016/0034786 A1 | 2/2016 | Suri et al. |
| 2016/0070962 A1 | 3/2016 | Shetty et al. |
| 2016/0353139 A1 | 12/2016 | Smith et al. |
| 2016/0358628 A1 * | 12/2016 | Liu .................... G06K 9/00765 |
| 2017/0078718 A1 | 3/2017 | Ioffe |
| 2017/0109584 A1 | 4/2017 | Yao et al. |
| 2017/0109586 A1 * | 4/2017 | Rana ................... G06K 9/00335 |
| 2017/0124398 A1 * | 5/2017 | Birkbeck ............... G06K 9/224 |

* cited by examiner

MACHINE LEARNING IN VIDEO CLASSIFICATION

CROSS-REFERENCE TO RELATED APPLICATION(S)

This application is a continuation of U.S. application Ser. No. 15/905,710, filed Feb. 26, 2018, now U.S. Pat. No. 10,671,852, which application claims priority under 35 U.S.C. § 119(e) to U.S. Provisional Patent Application Ser. No. 62/465,788, "System and Method for Video Content Searching," filed Mar. 1, 2017, and to U.S. Provisional Patent Application Ser. No. 62/465,790, "System and Method and Interface for Video Content Searching," filed Mar. 1, 2017, all of which are incorporated herein by reference in their entirety.

BACKGROUND

1. Field of the Disclosure

This disclosure pertains in general to media content classification, and more specifically to classifying portions of media content using machine-learning detectors and modifying user interface elements based on the classification.

2. Description of the Related Art

As the creation and sharing of digital media becomes more widespread, it becomes increasingly difficult to process the flood of information to find desired content. For example, the number of video files that are created and shared on the Internet have exceeded what can be manually reviewed by one or even a team of curators. However, conventional search engines are limited in their ability to search video content. Text-based search engines search for content using search strings that match text descriptors associated with media content. Often, text cannot accurately describe video content, and the search engine is unable to identify objects within the video based on text inputs.

SUMMARY

Described herein are systems and methods that search for objects, faces, or other items selected by users in media content items to find media content items (such as videos or frames of video) where the media content preferred by users appear. The media content items can be live or pre-recorded. The systems employ detectors to identify objects within media content items. The detectors configured to detect an object can be trained using a machine learned model (e.g., a convolutional neural network) as applied to a set of example media content items that include the object. A detector can detect a predetermined set of visual features representing objects. For example, a detector can detect one or more entities (e.g., an object, a particular individual, a human, etc.), an entity of a particular characteristic (e.g., a fawn pug puppy, an Asian female wearing a blue jacket, etc.), an action (e.g., flying, sailing, etc.), a color, a texture, a shape, a pattern, and the like.

The systems provide user interfaces. The user interfaces are configured to allow users to review results of a search in media content items for a selected object, pinpoint relevant portions of media content items where the selected object is determined to be present, review and retrain detectors, specify example media content items for retraining detectors, providing search result feedback, reviewing video monitoring results and analytics, and the like.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The teachings of the present disclosure can be readily understood by considering the following detailed description in conjunction with the accompanying drawings.

FIGS. 5A through 5D illustrate a user interface for highlighting searched content, according to one embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

System Overview

Figure 1:
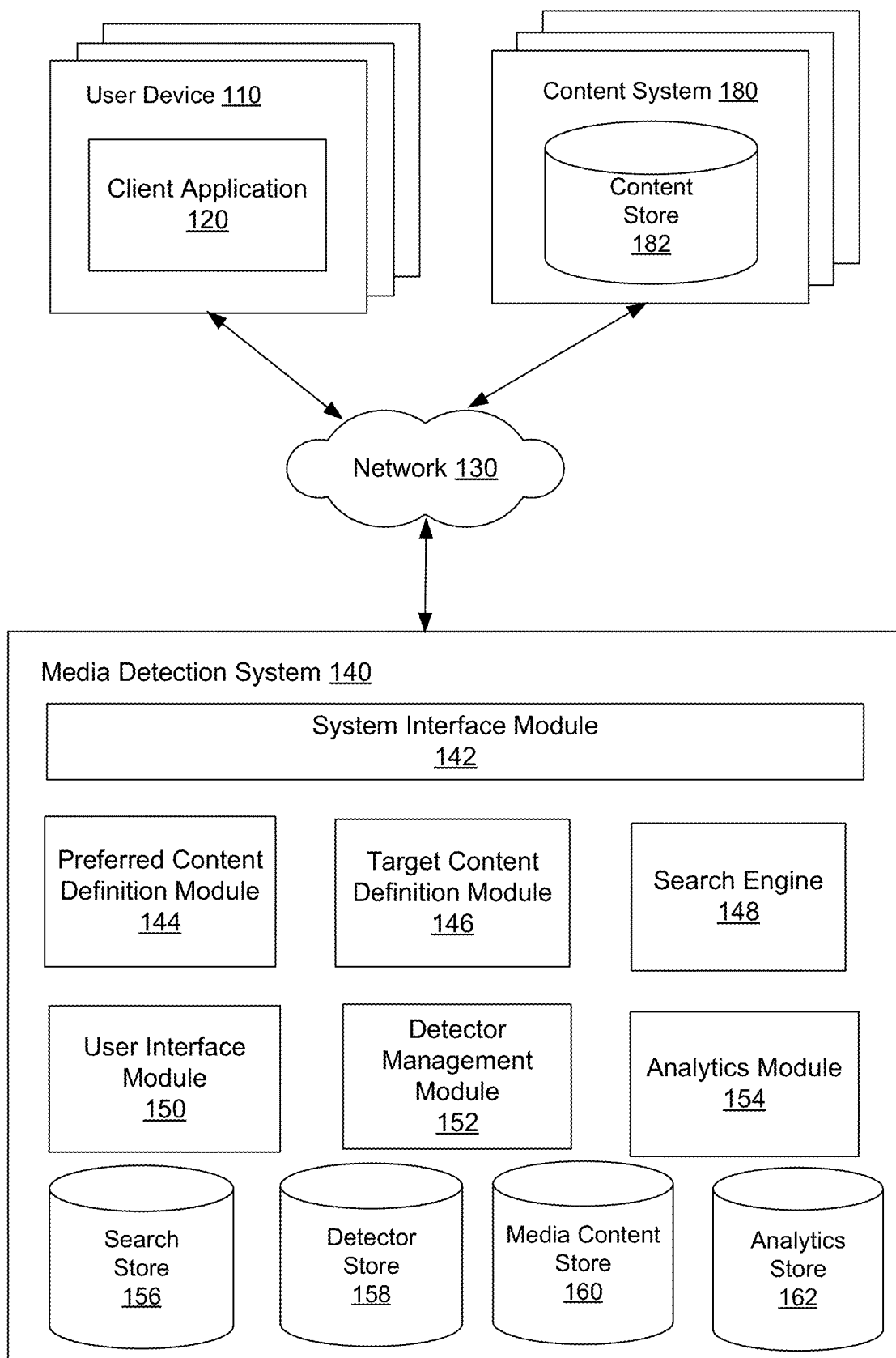
FIG. 1 is a block diagram of an overall system environment illustrating a media detection system providing media detection services, according to an embodiment.

FIG. 1 is a block diagram of an overall system environment illustrating a media detection system 140 providing media detection services, according to an embodiment. The media detection system 140 searches for media content preferred by users (referred to herein as "preferred content" or "selected object") in media content items to find media content items (such as videos or frames of video) where the media content preferred by users appear. The media detection system 140 provides user interfaces that allow users to pinpoint relevant segments where media content preferred by the users appear, that allow users to configure detectors to search for content, that highlight content preferred by users in media content items, and that present monitoring results and analytics of the results. As shown in FIG. 1, the overall system environment includes the media detection system 140, one or more user devices 110, one or more content systems 180, and a network 130. Other embodiments may use more or fewer or different systems than those illustrated in FIG. 1. Functions of various modules and systems described herein can be implemented by other modules and/or systems than those described herein.

A user device 110 (also referred to herein as a "client device") is a computing system used by users to interact with the media detection system 140. A user interacts with the media detection system 140 using a user device 110 that executes client software, e.g., a web browser or a client application 120, to connect to the media detection system 140 (via the system interface module 142). The user device 110 displayed in these embodiments can include, for example, a mobile device (e.g., a laptop, a smart phone, or a tablet with operating systems such as Android or Apple IOS etc.), a desktop, a smart automobiles or other vehicles, wearable devices, a smart TV, and other network-capable devices.

The user device 110 can present media content provided by the media detection system 140 or a content systems 180. In some embodiments, the user device 110 includes an embedded video player such as, for example, the FLASH player from Adobe Systems, Inc., or any other player adapted for various media formats used in the media detection system 140.

A content system 180 is a computing system that generates and/or hosts media content. For example, the content system provides a media content hosting service that users can upload, browse, search for, stream, and/or play media content items. As another example, the content system 180 is a network video camera that captures images of its surrounding area and streams the captured content. The content system 180 may include a content store 182 that stores media content items.

The network 130 facilitates communication between the user devices 110 and the media detection system 140. The network 130 is typically the Internet, but may be any network, including but not limited to a LAN, a MAN, a WAN, a mobile wired or wireless network, a cloud computing network, a private network, or a virtual private network.

The media detection system 140 includes a system interface module 142, a preferred content definition module 144, a target content definition module 146, a search engine 148, a user interface module 150, a detector management module 152, an analytics module 154, a search store 156, a detector store 158, a media content store 160, and an analytics store 162, all of which are further descried below. Other conventional features of the media detection system 140, such as firewalls, load balancers, authentication servers, application servers, failover servers, and site management tools are not shown so as to more clearly illustrate the features of the media detection system 140. The illustrated components of the media detection system 140 can be implemented as single or multiple components of software or hardware. In general, functions described in one embodiment as being performed by one component can also be performed by other components in other embodiments, or by a combination of components. Furthermore, functions described in one embodiment as being performed by components of the media detection system 140 can also be performed by one or more user devices 110 in other embodiments if appropriate.

The system interface module 142 coordinates communication between the user devices 110, the content systems 180, and the media detection system 140. For example, the system interface module 142 receives requests from the user devices 110 and interfaces with one or more other modules of the media detection system 140 to process the requests. The system interface module 142 also receives media content items from the user devices 110 and/or the content systems 180. The system interface module 142 transmits media content items and/or user interfaces to the user devices 110. As described herein, a media content item is a file (i.e., a collection of data) including media content such as pictures, videos, movie clips, games, sound tracks, and the like. The file can be various file formats. Although videos are used as examples to illustrate operations of the media detection system 140, this is done for the purpose of simplicity, and is not intended to be limiting in any way.

The system interface module 142 may process media content received from the user devices 110 and/or from the content systems 180. For example, the system interface module 142 assigns a unique media content item identifier to a media content item. The media content item can be identified by the unique media content item identifier. Other processing operations include, for example, formatting (e.g., transcoding), compression, metadata tagging, content analysis, classification/detection, and other data processing. The system interface module 142 may store a media content item in the media content store 154. The media content store 154 is a storage system where media content items are stored. A media content may be associated with metadata such as a location (e.g., URL (Uniform Resource Locator)), a title, a descriptor, and the like. As further described below, the one or more media content items received from the user devices 110 may be used to define a preferred content for which the media detection system 140 searches. The received media content items may also be used to create detectors which the media detection system 140 employs to search for preferred media content. In addition, the media detection system 140 may search in the received media content items for preferred media content.

The system interface module 142 interfaces with the content system 180 to process one or more media content items. For example, a user specifies a set of media content items for the media detection system 140 to process. The user provides locations such as URLs to the media content items in which the media detection system 140 searches for preferred media content. In some embodiments, the system interface module 142 obtains the one or more media content items from the content systems 180 and processes the obtained media content items locally. In some embodiments, the system interface module 142 interfaces with the content systems 180 such that the media detection system 140 can search for preferred media content in the media content items hosted by the content systems 180.

The preferred content definition module 144 defines preferred content for which the search engine 146 searches. Preferred content can be a set of visual features describing items such as objects, ideas, or concepts. The visual features can be static or dynamic over time. In various embodiments, the preferred content definition module 144 defines preferred content according to a user's specification. The user's specification can include a set of media content items. The set of media content items (or media content items representing the set of detectors) include visual features exemplifying the user's preferences for the preferred content. The user may upload the set of media content items to the media detection system 140. Alternatively, the user may browse media content items stored in the media detection system 140 and select from among the browsed media content items. For example, the user browses media content items used to train detectors. The user can upload and/or select the set of media content items via one or more user interfaces provided by the user interface module 150. Via the one or more user interfaces, the user can also identify portions of media content items such as a video segment, a section of a video frame, or a section of an image that include the visual features. For example, via a user interface, the user identifies a video frame that includes content representing "Saylor Twift wearing a red dress and sunglasses smiling", which is the preferred content.

The preferred content definition module 144 may associate text descriptors with defined preferred content. A text descriptor describes characteristics of the preferred content. The preferred content definition module 144 may store the preferred content in a search store 154. Text descriptors associated with the preferred content are also stored in the search store 154. The text descriptors can be used to identify searches.

The target content definition module 146 defines target content in which the search engine 146 searches for preferred content. Target content can include one or more target media content items such as videos. The videos can be pre-recorded or can be live videos. The user can provide the one or more target media content items in a variety of ways. For example, the user provides the web location of the one or more target media content items to the media detection system 140. As another example, the user browses the content system 180 via the media detection system 140 and selects the one or more target media content items. As a further example, the user searches for the one or more target media content items in the content system 180 directly or via the media detection system 140. As yet another further example, the user uploads the one or more target media content items to the media detection system 140, or browses and selects the target media content items from media content items stored in the media detection system 140. The user can provide the one or more target media content items via one or more user interfaces provided by the user interface module 150. For example, via a user interface, the user interfaces with a native search interface of a content system 180 and searches for target videos by typing in key words "Saylor Twift red dress" in the native search interface.

The search engine 148 searches for preferred content in one or more target content items. In various embodiments, the search engine 148 employs one or more detectors to search for the preferred content in a target content item. The one or more detectors determine whether the preferred content is present in the target content item. A detector is configured to detect one or more items, such as a selected object, a face, an identified person, a feature of an item, and the like, within frames of video. A detector can be a classifier configured to classify a frame of video based on a likelihood that the frame of video includes a particular item within the frame. The detector can output a Boolean result of the classification (e.g., "true" if the frame includes the item or "false" if not), or can output a confidence score representative of the likelihood that the frame includes the item (as described below). In some embodiments, a detector can detect multiple items within the frame, and in some embodiments, multiple detectors can detect a single item with the frame. The search engine 148 can select the one or more detectors based on the preferred content. For example, the search engine selects the one or more detectors from detectors stored in the detector stores 158, that are associated with the media content items used to define the preferred content.

For each target content item, the search engine 148 outputs one or more confidence scores. A confidence score indicates a likelihood of the preferred content being present in the media content item (or a portion thereof). The search engine 148 may further output one or more locations (e.g., a set of pixels) of the preferred content being present in a target media content item (or a portion thereof). If the preferred content appears multiple times in a media content item, the search engine 148 may determine an overall confidence score indicating the preferred content being present in the media content item using the confidence scores. The search engine 148 associates the one or more confidence scores and the one or more locations with the target content item and stores the one or more confidence scores and the one or more locations associated with the target content item in the search store 154. For a particular item detected to be present within a particular video frame, the confidence score associated with the item may be an average of confidence scores outputted by multiple detectors, if multiple detectors are used.

A detector configured to identify an object within media content items can be trained using a machine learned model (e.g., a convolutional neural network) as applied to a set of example media content items that include the object. The search engine 148 can select a set of detectors stored in the detector store 156 to conduct the search. A detector can detect a predetermined set of visual features representing items. For example, a detector can detect one or more entities (e.g., an object, a particular individual, a human, etc.), an entity of a particular characteristic (e.g., a fawn pug puppy, an Asian female wearing blue jacket, etc.), an action (e.g., flying, sailing, etc.), a color, a texture, a shape, a pattern, and the like.

The user interface module generates user interfaces. The user interfaces are configured to allow users to review search results, pinpoint relevant portions of media content items where the preferred content is determined to be present, review detectors, configure detectors, specify example media content items for configuring detectors, providing feedback on search results while reviewing the search results, reviewing monitor results, and/or review analytics of monitor results.

In some embodiments, the user interface module 150 generates user interfaces that allow users to pinpoint relevant portions of media content items that are determined to include the preferred content. For example, if the search engine 148 determines that a video includes the preferred content, the user interface module 150 generates a user interface that allows a user to review the video. The user interface module 150 may generate a user interface presenting a list of video content items that are determined to include the preferred content. A user can select a video from the list of videos to review. Based on the user's selection, the user interface module 150 plays the selected video. The user interface includes a video player that plays the video. The user interface may include a progress bar indicating a progress of playing the video. The user interface module 150 may generate user interface elements (e.g., bars) overlaid on top of the progress bar to illustrate video segments where the preferred content determined to be present. If a confidence value for a particular video frame is greater than the threshold confidence value, the preferred content is determined to be present in the video frame.

The user interface elements are visually distinguished from the progress bar. A starting location of a user interface element is determined based on a starting time point of the video segment. A length of the user interface element is determined according to a duration of the video segment. The user interface module 150 can obtain the confidence scores from the search store 156. The starting time point of the video segment can be determined according to a timestamp (absolute or relative to the beginning of the video) of a beginning video frame of the video segment. The duration can be determined in a similar manner. In some embodiments, the user interface module 150 generates a user interface element if the corresponding video segment lasts at least a threshold duration. The user interface module 150 configures the user interface such that a user can input a threshold confidence value. A user can input the threshold confidence value concurrently when the video is being played. The user interface module 150 dynamically configures the user interface elements for illustrating the relevant video segments according to the user's input of the threshold confidence value.

In some embodiments, the user interface module 150 generates user interfaces that allow users to configure detectors. In particular, the user interface module 150 generates user interfaces that allow users to configure example media content items (e.g., images, videos, portions of images, portions of videos such as video segments, portions of video frames) for training and/or updating detectors. The user interface module 150 generates user interface elements configured to allow users to provide example media content items from various source locations. Via a user interface element, a user can configure to upload media content items stored locally on the user device 110 to the media detection system 140. Via another user interface element, a user can configure to use videos provided (e.g., hosted or generated) by the content system 180. Via a further user interface element, a user can configure to use a portion of a media content item. An example media content item can be a positive example or a negative example. Positive example media content items include visual features that a detector is configured to search for in preferred content. Negative example media content items include visual features that a detector is configured to avoid in preferred content.

The user interface element module 150 generates a user interface that allows users to provide feedback for updating detectors while reviewing search results. For example, the user interface element module 150 includes user interface elements via which a user can confirm whether a video frame which is determined to include preferred content. In other words, the user interface elements are configured to receive user input on whether a detector's output is correct. If the user confirms that the video frame includes the preferred content, the particular video frame (or portions thereof) is included as a positive example in the example media content items for updating the detector. Conversely, if the user rejects that the video frame includes the preferred content, the particular video frame (or portions thereof) is included as a negative example in the example media content items for updating the detector. The detector can be updated concurrently when it is being employed by the search engine 148.

The user interface element module 150 generates user interfaces that highlight sections of images or video frames that are determined to include the preferred content. For example, if the search engine 148 determines that a video includes the preferred content, the user interface module 150 generates a user interface that allows a user to review the video. The user interface includes a video player that plays the video. The user interface element module 150 further generates user interface elements (e.g., a border box) configured to surround the portion of the video frame where the preferred content is determined as being present. The user interface elements are overlaid on top of the region displaying the video. The location and dimension of the user interface elements can be determined according to the search engine's output. The user interface elements track the preferred content over time. To improve user experience, the user interface element module 150 may interpolate locations of the user interface elements across consecutive video frames to avoid abrupt location changes.

The user interface element module 150 generates user interfaces that present video monitoring results. The media detection system 140 can monitor live video streams for preferred content. For example, the user interface element module 150 generates a user interface that includes user interface elements illustrating how many times the preferred content is detected during a time period on top of a calendar view. As such, a user can visualize detection events via the user's calendar. The user can select to review a particular detection event such as a time stamp of the video frame, the particular video frame where the preferred content is determined to appear, and the like. A user can request to review analytics of the monitoring results such as an accumulated count of occurrences of the preferred content over a time interval, a total count of occurrences of the preferred content, and/or an average count of occurrences of the preferred content over a time interval. The user interface element module 150 generates user interfaces that include different user interface elements for presenting the analytics.

The detector management module 152 trains and manages detectors. A detector can be configured to search for a particular set of media content features in target media content items. In various embodiments, the detector management module 152 creates the detectors by training one or more machine learning models using training data. The training data include example media content items provided by a user. The example media content items can be obtained from a variety of sources. For example, a user specifies media content items by selecting media content items stored in the media content store 158, uploading media content items to the media detection system 140, selecting portions of a media content item, providing locations of media content items to the media detection system 140, and the like. The training data can include positive examples and/or negative examples. A positive example includes desired features and the negative example includes undesired characteristics. For example, a user specifies positive examples to the media detection system 140 to indicate that media content being visually similar to the positive example is desired. The negative example is used to indicate undesired content.

The detector management module 152 may generate a label describing a detector. In particular, the label describes characteristics of visual features the detector is configured to search for. A user can provide the label to the media detection system 140. The detector management module 152 associates the label with the detector and stores the detector associated with the label in the detector store 156.

The detector management module 152 may update detectors using user feedback. For example, if a user confirms (or disapproves) a detector's output, the detector management module 152 includes the media content item as a positive example (or a negative example) in example media content items used for training the detector. The update may be performed concurrently when the detector is being employed.

The detector management module 152 may determine popularity of detectors stored in the detector store 158. The detector management module 152 tracks a number of times the detector employed by the search engine 148 over a time period. The detector management module 152 may determine a popularity score based on the number of times. The detector management module 152 associates the popularity score (or the number of times) with the detector and stores the association in the detector store 158.

The analytics module 154 analyzes search results. For example, the analytics module 154 obtains search results from the search store, and determines an accumulated count of preferred content being present in a time interval, a total count of preferred content being present, an average count of preferred content being present in a time interval, and the like. The accumulated count of preferred content being present in a time interval is determined by summing up a number of times that the preferred content is determined to be present in video frames in a time interval (e.g., one hour, one day, one month). The video frames are associated with time stamps in the time interval. The total count of preferred content being present is determined by summing up a number of times that the preferred content is determined to be present in video frames since a predetermined time point (e.g., a beginning of the video). The video frames are associated with time stamps in the time interval. The average count of preferred content being present in a time interval is determined by summing up a number of times that the preferred content being present in the same period (e.g., between 9 AM and 10 AM) over multiple time durations (e.g., 5 days) and dividing the number of times by the number of multiple time durations.

Example User Interface for Presenting Search Results

Figure 2A:
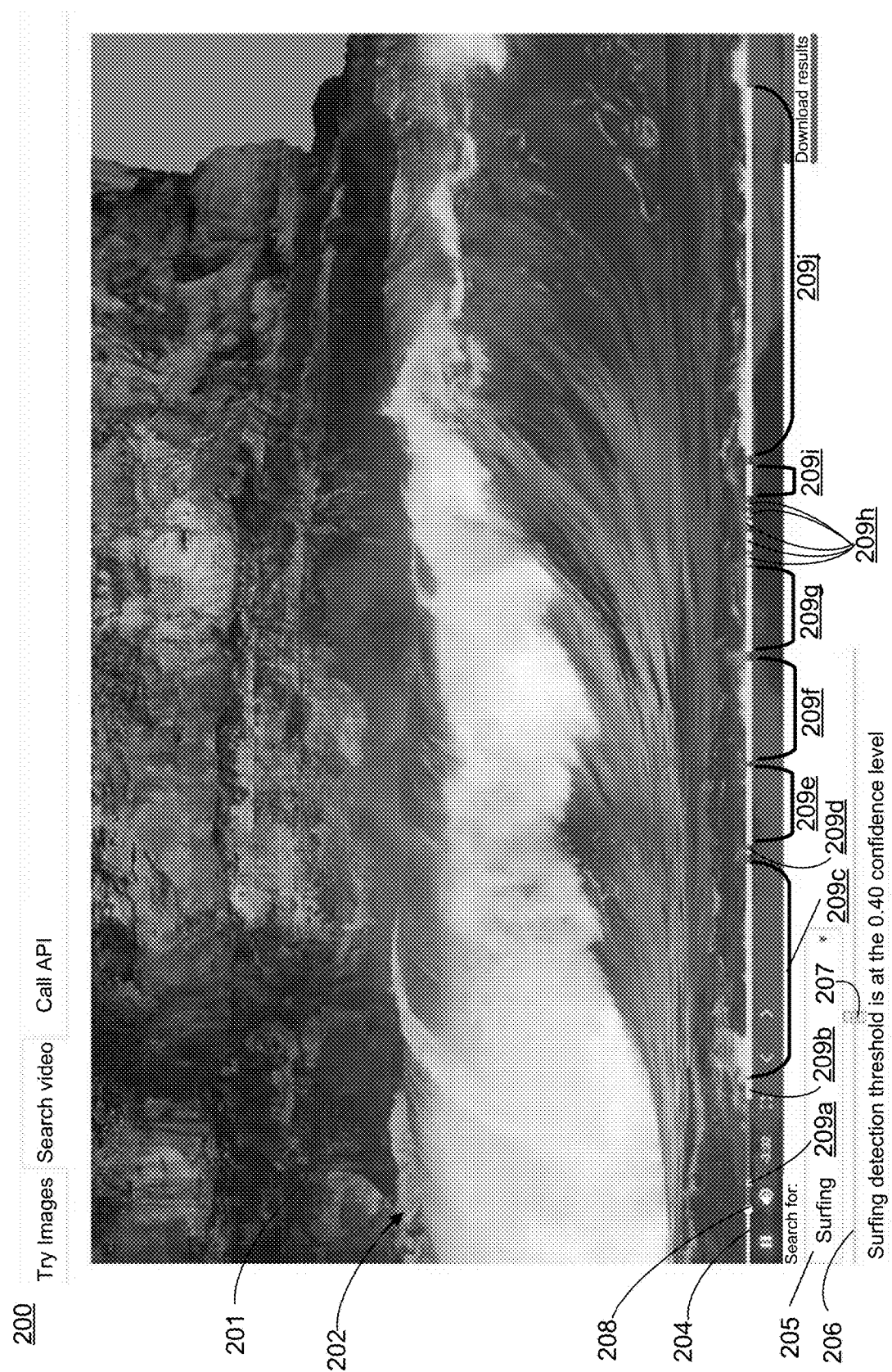
FIGS. 2A through 2C are example user interfaces for presenting search results, according to one embodiment.
Figure 2B:
Figure 2C:

FIGS. 2A through 2C are example user interfaces for presenting search results, according to one embodiment. The example user interface 200 includes a video player that presents videos. In other embodiments, the arrangements of elements in the user interface may be different.

The media detection system 140 provides the user interface (UI) 200 to a user device 100 for presenting videos as search results. Referring now to FIG. 2A, the user interface 200 includes user interface elements 204 through 209. The user interface elements 204 through 209 allow a user to review videos determined by the media detection system 140 to include the preferred content. Specifically, the user can pinpoint relevant sections of the videos that are determined to include the preferred content. The user can also configure the preferred content, and configure the relevancy of the videos.

FIG. 2A and the other figures use like reference numerals to identify like elements. A letter after a reference numeral, such as "209a," indicates that the text refers specifically to the element having that particular reference numeral. A reference numeral in the text without a following letter, such as "209," refers to any or all of the elements in the figures bearing that reference numeral (e.g. "209" in the text refers to one or more of the reference numerals "209a" and/or "209f" in the figures).

The user interface 200 includes a display area 201 for displaying a video 202 that is determined to include preferred content. The user interface element 204 visualizes the progress of the video 202 being played. The user interface element 240 uses visually distinguished elements to illustrate the progression. For example, the user interface element 240 is a progress bar, a segment of the bar is of a first color to indicate an amount of the video 202 that has been played and the remaining segment of the bar is of a different color to indicate the remaining amount of the video 202 to be played. The segments can also be of different patterns, brightness, thickness, and the like so long as they are visually distinguished.

The user interface 200 also includes a user interface element 208 configured to control playback of the video 202. In the illustrated example, the user interface element 208 is a seek button overlaid on top of the user interface element 204. The user interface element 208 is configured to be moved along the user interface element 204 to select a particular temporal location in the video 204 to be played. Video frames after the selected temporal location in the video 204 are to be presented.

The user interface 200 further includes user interface elements 209 visualizing temporal portions of the video 202 that includes preferred content. The user interface element 209 can be a bar overlaid on top the user interface element 204. When being overlaid on top of the user interface element 204, the user interface element 209 is positioned at a location of the user interface element 204 that corresponds to the temporal portion of the video 202. The length of the user interface element 209 is proportional to an interval of the video 202 that includes the preferred content. As one example, assuming that the video 202 is 10 minutes long, the user interface element 209a indicates that the interval between 73 seconds and 76 seconds include the preferred content. The user interface element 209 is visually distinguished from the user interface element the user interface element 204.

The user interface 200 is configured to include user interface elements 209 if a confidence score associated with a video frame is greater than a threshold confidence score. The confidence score indicates a likelihood of a video frame including preferred content. If the confidence score is greater than a threshold confidence score, the video frame is determined to include preferred content. As described previously, the user interface module 150 obtains the confidence scores associated with the video frames from the search engine 148.

In some embodiments, the user interface module 150 configures a user interface element 209 such that a corresponding time interval of consecutive frames determined to include preferred content is at least a threshold time interval. For example, the user interface module 150 determines a time interval of a set of consecutive video frames associated with confidence scores greater than the threshold confidence score. In some embodiments, an average confidence score of the set of consecutive video frames is determined. The average confidence score is greater than the threshold confidence score. It is possible that a video frame included in the set of consecutive video frames is associated with a confidence score that is below the threshold confidence score. The user interface module 150 compares the time interval to the threshold time interval to determine whether to generate a user interface element 209. If the time interval is less than the threshold time interval (e.g., 0.5 s), the user interface module 150 does not generate a user interface element 209. The threshold time interval may a system default value configured by a system administrator of the media detection system 140 or configured by the user. By doing this, the user interface module 150 prevents the user interface 200 from being overcrowded by user interface elements 209 to reduce visual distractions thereby improving user experiences. Users are directed to video segment including more substantial relevant content. False positive search results are also reduced because the user interface module 150 accounts for the analysis of a series of consecutive frames. A false positive result is a video frame that does not include preferred content but is determined to include the preferred content.

The user interface 200 includes user interface elements 206 and 207 for users to configure the threshold confidence score. The threshold confidence score is used to determine whether the preferred content appears in a video frame as described above. In the illustrated example, the user interface element 206 is a sliding scale and the user interface element 207 is a slider configured to be moved along the user interface element 206. Moving the user interface element 207 generates signals representing the user's input of the threshold confidence score. Other embodiments of the user interface 200 can include a text box where the user types in the threshold confidence value, a drop-down menu where the user can select the threshold confidence value, buttons where the user can click on to adjust the threshold confidence value, and other designs where the user can input a numerical value. The user can configure the threshold confidence score concurrently while the video 202 is being played.

The user interface element 205 is configured to receive user inputs specifying which search results to be displayed. In the illustrated example, the user interface element 205 is a drop-down menu displaying the user's search history of preferred content. According to the user's selection of "Surfing" which is a text descriptor associated with the preferred content, corresponding search results are displayed.

Now turning to FIG. 2B, the user interface element 208 is moved. The video frame corresponding to the temporal location of the user interface element 208 is displayed. Because the user interface element 208 overlaps the user interface element 209c, the displayed frame includes preferred content. As illustrated, the displayed video frame displays a surfer. The user interface 200 further displays a user interface element 210 that presents the confidence score associated with the video frame.

As illustrated in FIG. 2C, the location of the user interface element 207 is moved closer to the rightmost end of the user interface element 206, compared to the location of the user interface element 207 illustrated in FIG. 2A. This location adjustment increases the threshold confidence score, which may affect the determination of which video frames include the preferred content. Some video frames that are determined to include the preferred content may be associated with confidence scores that are not greater than the adjusted confidence score. The user interface module 150 configures the user interface 200 dynamically. In particular, the user interface module 150 dynamically updates the user interface 200 by updating the user interface elements 209 according to the threshold confidence score input by the user. In the illustrated example, because the threshold confidence score is increased, the user interface elements 209 are more sparse compared to the user interface elements 209 illustrated in FIG. 2A, indicating that fewer video frames include the preferred content.

Example User Interface for Providing Detectors

Figure 3A:
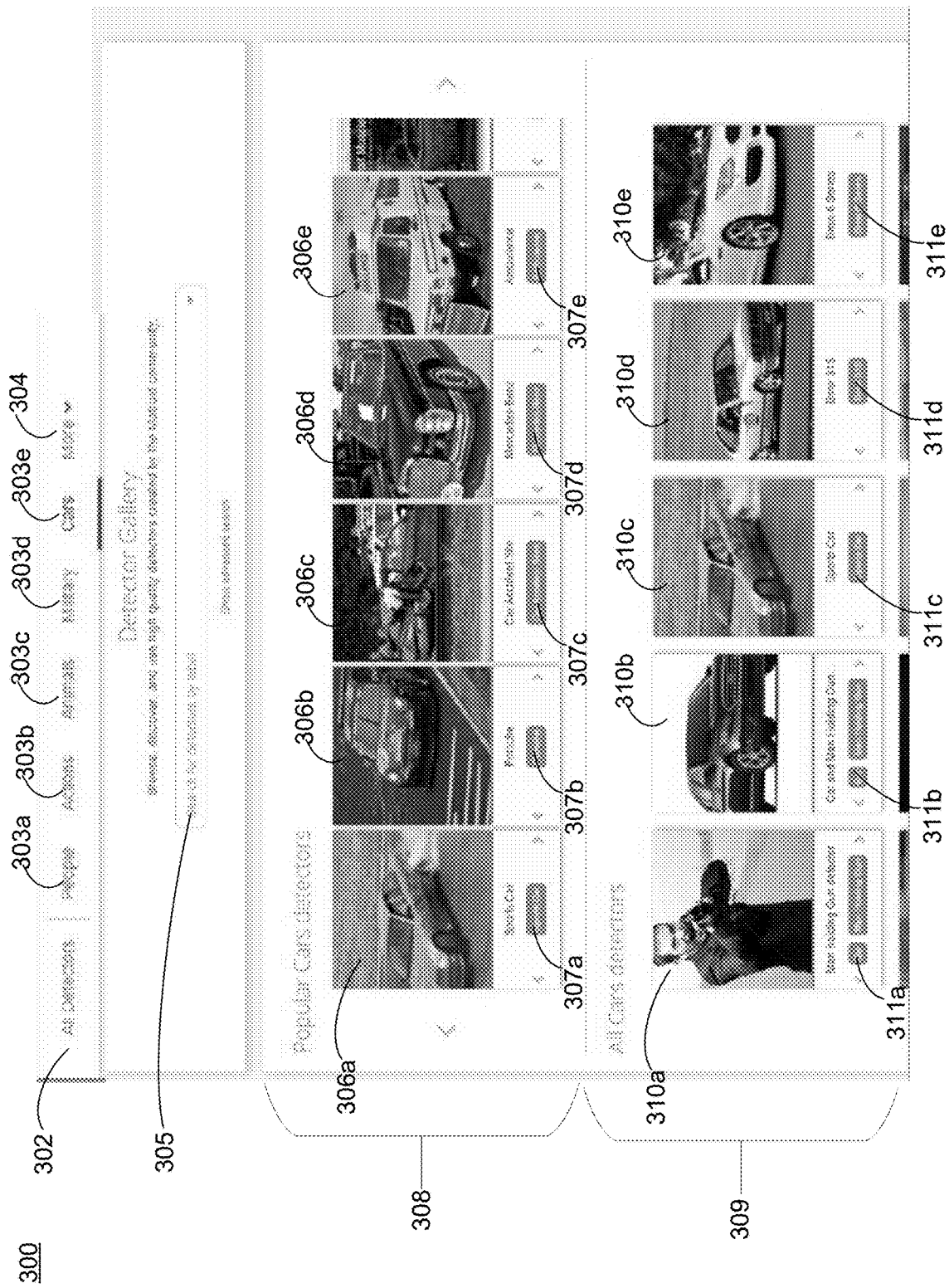
FIGS. 3A through 3B illustrate example user interfaces for users to select detectors, according to various embodiments.
Figure 3B:
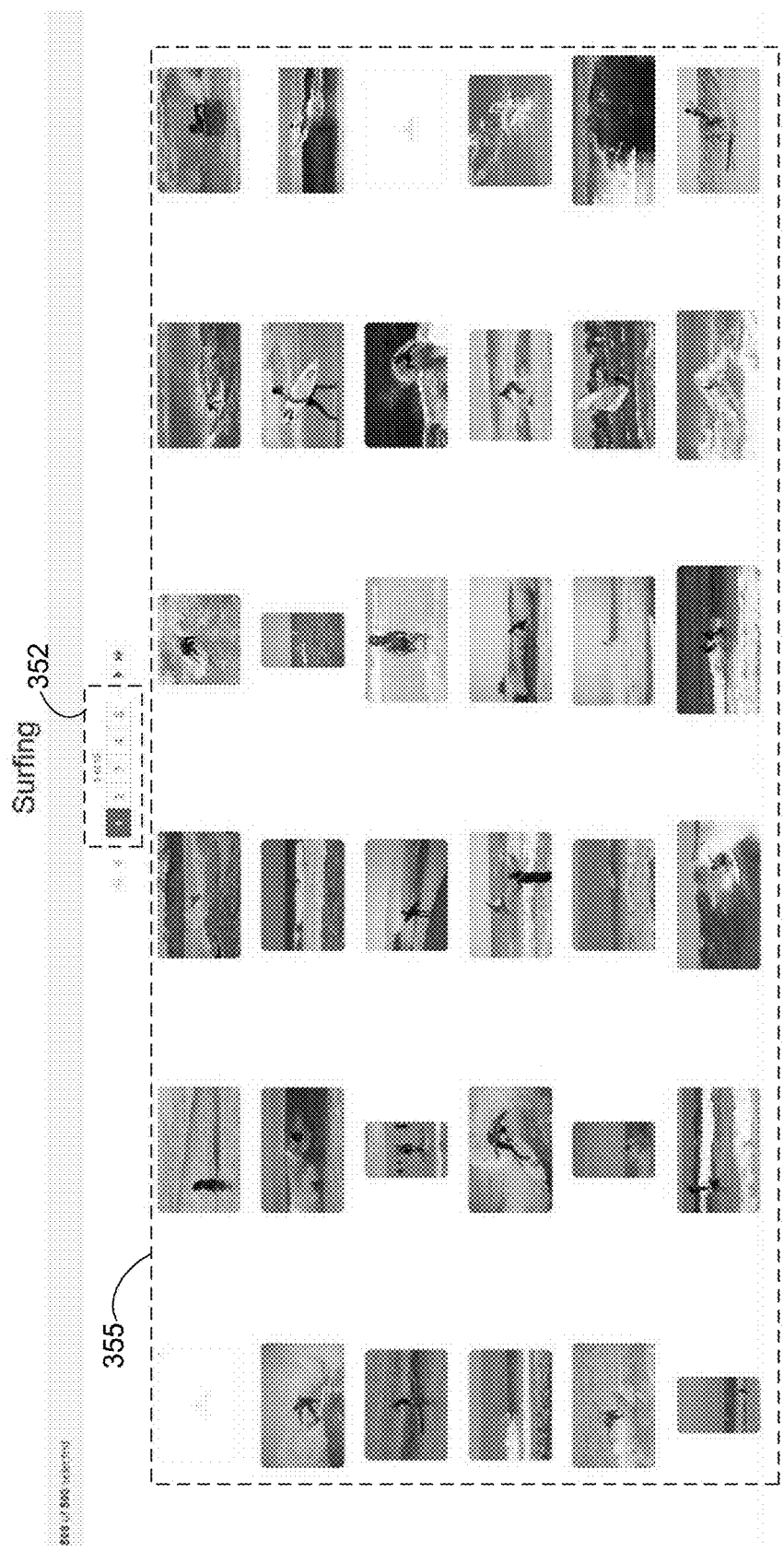

FIGS. 3A through 3B illustrate example user interfaces for users to select detectors, according to various embodiments. The user interface 300 illustrated in FIG. 3A allows users to browse and to search for detectors stored in the detector store 156. The user interface 300 includes a user interface element 302 providing categories of detectors. A user can browse detectors based on categories presented via the user interface element 302. User interface elements 303 correspond to different categories of detectors. If a use interface element 303 is triggered (e.g., clicked on, pressed, toggled, etc.), the user is presented with detector representations of the categories corresponding to the triggered user interface element. A detector representation includes images and/or text descriptors representing preferred content the detector is configured to detect. For example, the user interface element 303e "Cars" is activated and the user is presented with detector representations of detectors of the category cars. The user interface element 303 is configured such that it appears visually different when activated and when not activated. As illustrated, the user interface element 303e is of a different color (e.g., black) from the user interface elements 303a through d that are not activated. The user interface element 304 allows a user to browse additional categories. For example, the user interface element 304 is configured such that its activation generates a signal configured to expand the user interface element 302 to present additional detector categories.

The user interface 300 includes a user interface element 305 that allows a user to search for detectors. In the illustrated example, the user interface element 305 is a text box configured to receive user input. A user can input texts such as labels describing detectors. For example, pugs, dogs, show dogs, dog running, and the like are example labels.

The user interface 300 includes sections 308 and 309 for presenting detection representations representing detectors of a category. Users can browse detector representations presented in the sections 308 and 309. In the illustrated example, detection representations of popular detectors are displayed in the section 308 and detection representations of all detectors are displayed in the section 308. Popular detectors are detectors of which the associated popularity score greater than a threshold popularity score. In some embodiments, the user interface module 150 receives rankings of the detectors associated with the detectors stored in the detector store 156 and organizes the detectors according to the rankings. In some embodiments, the user interface module 150 receives popularity of the detectors associated with the detectors stored in the detector store 156 and organizes the detectors according to the popularity. The user interface module 300 provides the detectors according to the order.

User interface elements 306 and 310 provide detection representations of individual detectors. For example, the user interface element 306b provides a picture of a race car, the user interface element 306d provides a picture of a vintage car, the user interface element 310a provides a picture of a man holding a gun, and the user interface element 310b provides a picture of a sedan. In addition, user interface elements 306 (310) include text descriptors 307 (311) describing the detector. For example, the user interface element 306a provides the user interface 307a providing the text descriptor "Sports Car," the user interface element 306c provides the user interface 307c providing the text descriptor "Car Accident Site," and the user interface element 310c provides the user interface 311c providing the text descriptor "Sports Car." In some embodiments, the user interfaces 307 (or 311) allow users to modify text descriptor.

Now referring to FIG. 3B, the user interface 350 presents representations of detectors of the surfing category. For example, a user inputs "surfing" into the user interface element 305 and is directed to the user interface 350. The user interface 350 provides user interface elements 355 providing images of the detectors. The user interface elements 355 are arranged into a matrix. A user can select a particular detector by clicking on a corresponding user interface element 355. The user interface elements 352 allow users to browse detectors by pages.

Example User Interface for Configuring Detectors

Figure 4A:
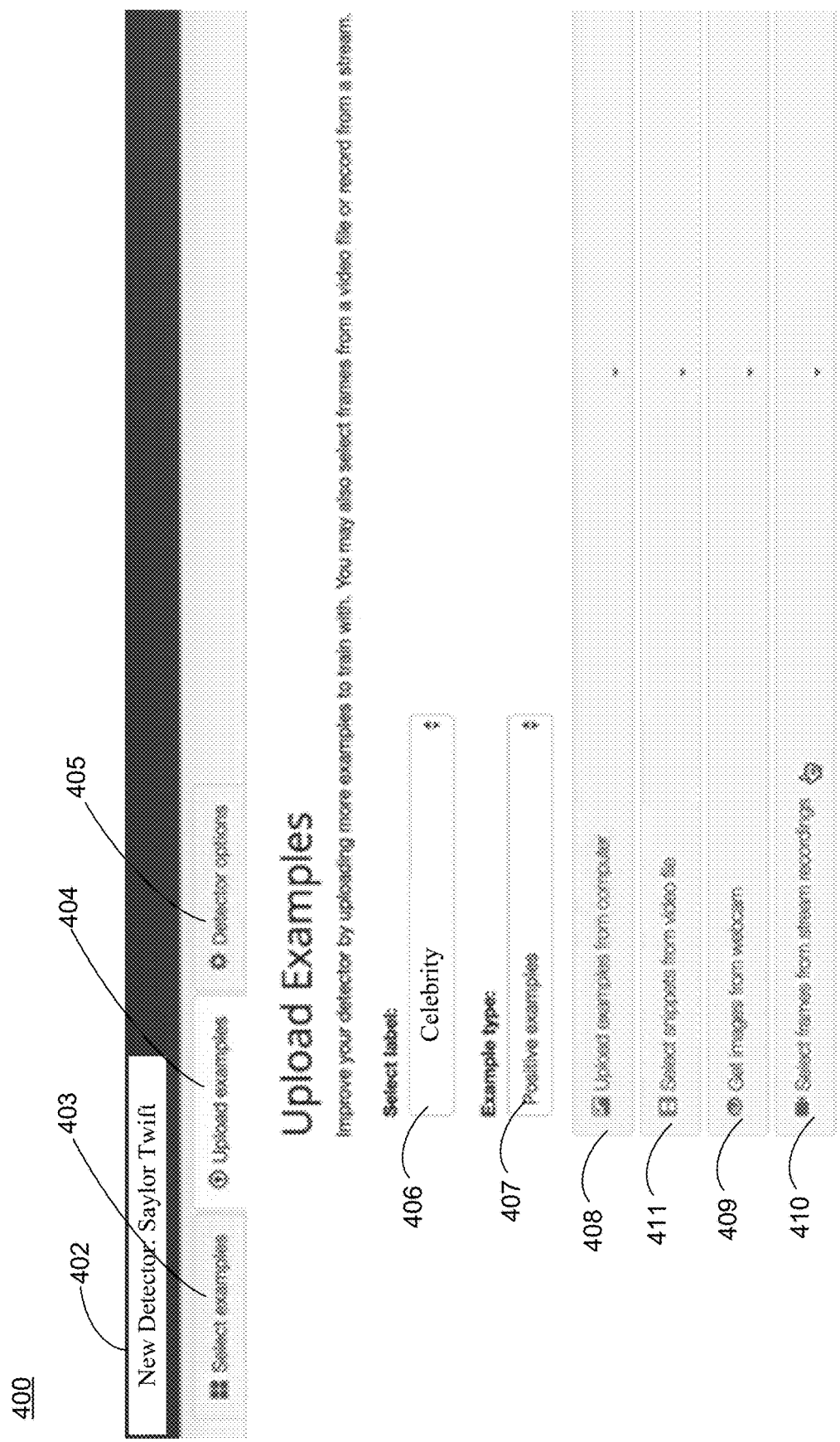
FIGS. 4A through 4D illustrate an example user interface for users to configure detectors, according to one embodiment.
Figure 4B:
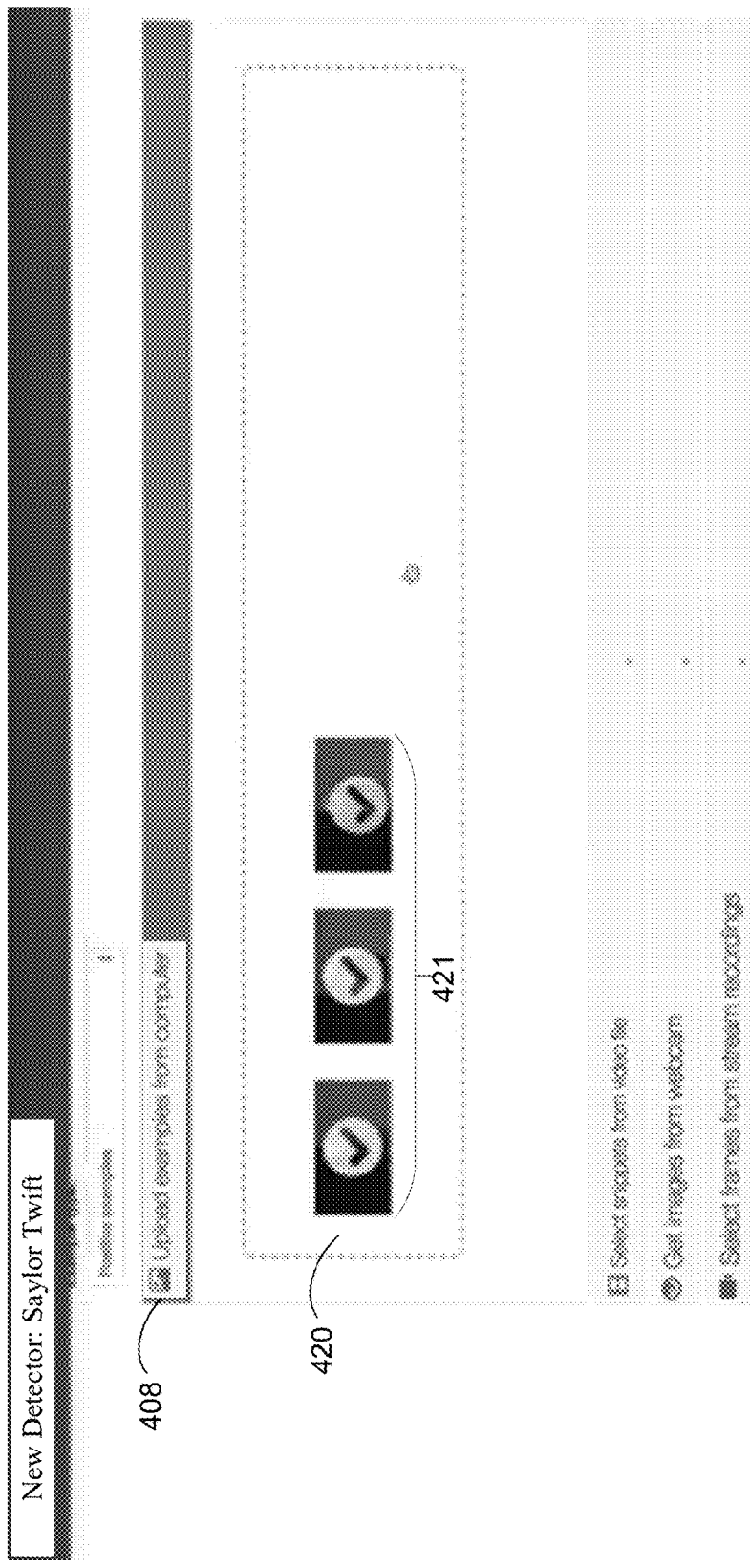
Figure 4C:
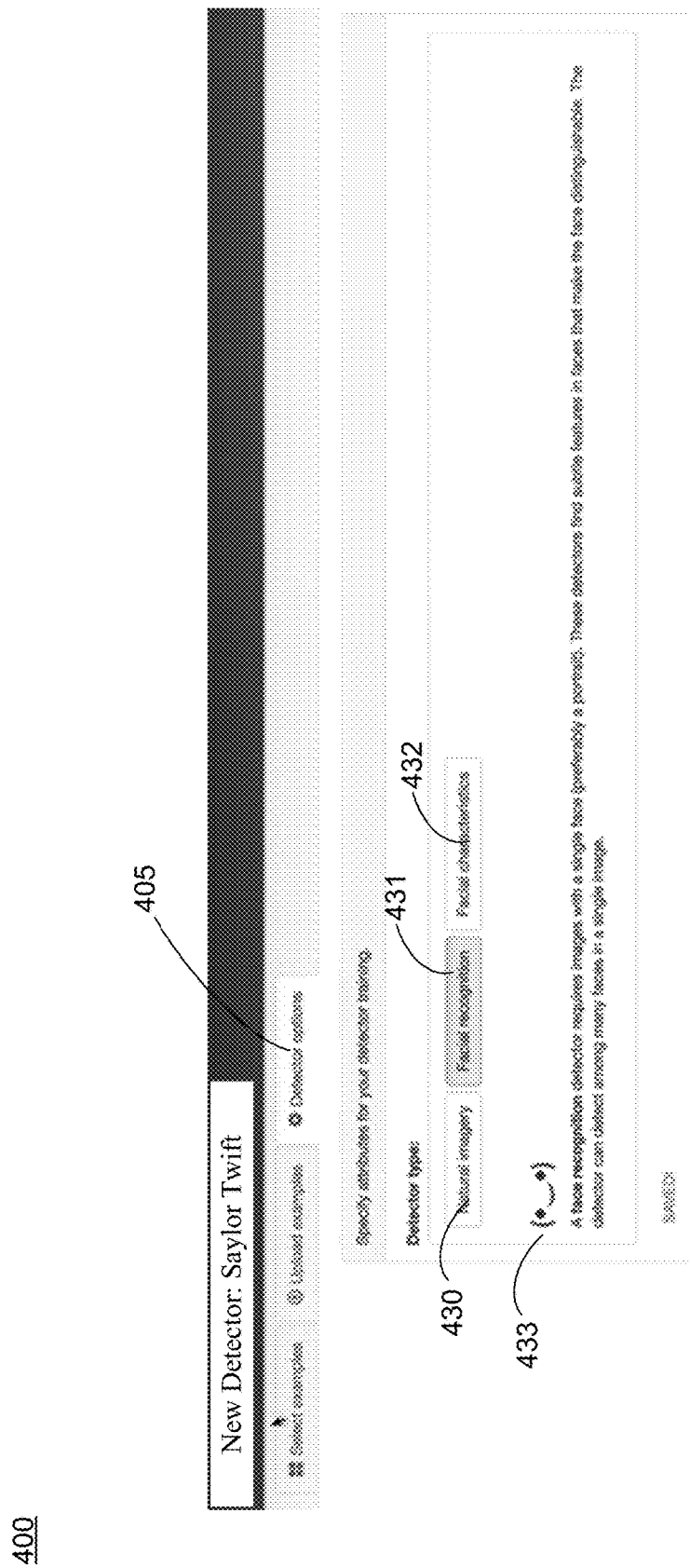

FIGS. 4A and 4C illustrate an example user interface for users to configure detectors, according to one embodiment. As described previously, detectors are used to detect content of particular visual features specified by users. Detectors can be used to search for preferred content. A detector is created by a series of media content items used to define the preferred content. As illustrated in FIG. 4A, a user interface 400 includes user interface elements 402 through 411 for users to provide input to configure a detector.

The user interface element 402 is a text box where a user can input a detector name designating the detector. As illustrated, the user inputs to configure a new detector "Saylor Twift."

The user interface elements 403-404 allow users to provide example media content items for configuring the detector "Saylor Twift." The example media content items for configuring the detector can be selected from the media content items stored on the media detection system 140 and/or uploaded to media detection system 140. The user interface element 403 is configured to direct the user to select from media content items stored on the media detection system 140. A user can browse, search for, and select media content items stored on the media detection system 140 by actuating the user interface element 403. A detector can be represented by a media content item used to create the detector.

The user interface element 404 allows users to upload example media content items for creating detectors. As illustrated, when the user interface element 404 is actuated, the user is presented with the options to select the sources where example media content items used for training detectors should be obtained. The user interface elements 408 through 410 allow users to configure specific sources for obtaining example media content items for configuring a detector. Each of the user interface elements 408 through 410 is configured to direct the user to select a particular source where media content items can be obtained. For example, the user interface element 408 is configured to allow a user to select the user device 110 as a source. By actuating the user interface element 408, a user can be configured to upload example media content items stored on the user device 100 to the media detection system 140 for configuring detectors. As illustrated in FIG. 4B, by actuating the user interface element 408, the user interface 400 is expanded to include a user interface element 420 configured to present example media content items 421 that have been selected by the user. The user interface element 420 is configured to generate a signal to trigger the media detection system 140 (e.g., detector management module 152) to obtain media content items of which the representations are positioned in the user interface element 420. The obtained media content items are stored in the media detection system 140. As illustrated, the user interface 400 is configured to illustrate a status of the media content items being uploaded. Checkmarks are used to illustrate that the media content items 421 have been uploaded to the media detection system 140.

Referring back to FIG. 4A, the user interface element 409 is configured to allow a user to select a content system 180 as a source. A user can specify a web location (e.g., an IP address) of the content system 180 and/or a web location (e.g., an URL) of media content items hosted by the content system 180. The user interface element 409 is configured to generate a signal to trigger the media detection system 140 to obtain an example media content item by visiting the web location. The user interface 400 may be configured to prompt users to provide user credentials for accessing the content system 180. Multiple media content items can reside at the same web location, and the media detection system 140 can obtain one or more of the multiple content items that reside at the same web location. If a media content item is a video, the user interface element is configured to allow a user to select one or more video frames of the media content item, to browse the series of video frames, to search for a video frame at a particular time point, to select a geometrical portion of a video frame, and perform other editing actions.

The user interface element 410 is configured similar to the user interface element 409 and description is omitted herein.

The user interface element 411 is configured to allow a user to edit selected media content items. The edited media content items are used to configure a detector. For example, the user interface element 411 is configured to generate a signal to activate a video editing tool if triggered. Via the video editing tool, a user can select a segment of the video and/or a portion of a video frame for configuring a detector.

The user interface element 407 is configured to allow a user to specify whether a provided media content item is a positive example or a negative example. The user interface element 407 is configured to generate a first signal indicating that a media content item is a positive example such that the detector management module 152 creates the detector to search for content having similar features as the media content item. A second signal is generated to indicate that another media content item is a negative example such that the detector management module 152 creates the detector not to search for content having similar features as this media content item.

The user interface element 406 is configured to allow a user to provide a set of labels describing a detector. The label may describe the category of the detector, content the detector is configured to search for, and other information of the detector. Labels can be used to facilitate users to search for and distinguish different detectors. The media detection system 140 stores labels associated with detectors. In the illustrated example, the user inputs texts "Celebrity" as a label to be associated with the detector designated by "Saylor Twift."

The user interface element 405 is configured to allow a user to configure characteristics of detectors. The characteristics can be features of preferred content desired and/or undesired by the user. Example characteristics include a detector type such as natural imagery, facial recognition, facial characteristics, and the like. Referring now to FIG. 4C, the user interface element 405 is activated, which triggers the user interface 400 to provide user interface elements 430 through 432 that allow users to configure a detector type of the new detector designated by "Saylor Twift." A detector of a detector type is configured to search for specific features in media content. For example, a detector of a natural imagery is configured to search for images of nature, a detector of a facial recognition is configured to search for images of faces (e.g., male, female, baby, etc.), and a detector of a facial characteristics is configured to search for images of facial characteristics (e.g., brown eyes, blue eyes, red eyes, pale skin, dark skin, etc.) The user interface 400 may provide information directing users to provide example media content items for configuring a detector of a particular detector type that is selected by the user.

Figure 4D:

FIG. 4D is an example user interface for users to configure detectors while reviewing search results, according to one embodiment. The media detection system 140 allows users to refine detectors by configuring detectors while reviewing search results generated by the detectors. As described previously, the detector management module 152 updates a detector concurrently when the search engine 148 employs the detector to search for preferred content. The detector management module 152 updates the detector based on user input. The user input is included in the example media content items for configuring the detector. For example, a video frame that is confirmed (disapproved) by a user is included as a positive (negative) example along with other example media content items for training the detector.

As illustrated, the media detection system 140 employs the "Saylor Twift" detector configured as illustrated in FIG. 4A to search for the defined preferred content in a video stream. The user interface 450 is configured to display search results for users' review and to receive user input for configuring detectors. As illustrated, the video frame 452 is presented in the display area 451 of the user interface 450. A user interface element 458 (e.g., a box) indicates to the user the portion of the video frame 452 that is determined to include the preferred content. The user interface element 458 is overlaid over the video frame 452. In the illustrated example, the box 458 is positioned to surround the individual's image to indicate to the user that the individual's image is likely to be Saylor Twift's image. The user interface element 456 indicates to the user the absolute confidence score of the individual's image being Saylor Twift's image and the user interface element 457 indicates to the user the confidence score in a sliding scale.

The user interface 450 includes the user interface elements 453 through 455 configured to allow users to provide feedback for configuring detectors while reviewing the search result. The user interface element 453 provides instructions on how to provide feedback. The user interface elements 454 and 455 receive user feedback. The user interface element 454 (455), if triggered, generates a signal indicating that the video frame 452 is a positive (negative) example. The user interface module 150 provides the user feedback to the detector management module 152 and the detector management module 152 includes video frame 452 in a set of example media content items for creating the detector. In some embodiments, the detector management module 152 includes only the portion that is determined to include the preferred content in the set of example media content items.

Example User Interface for Highlighting Searched Content

Figure 5D:
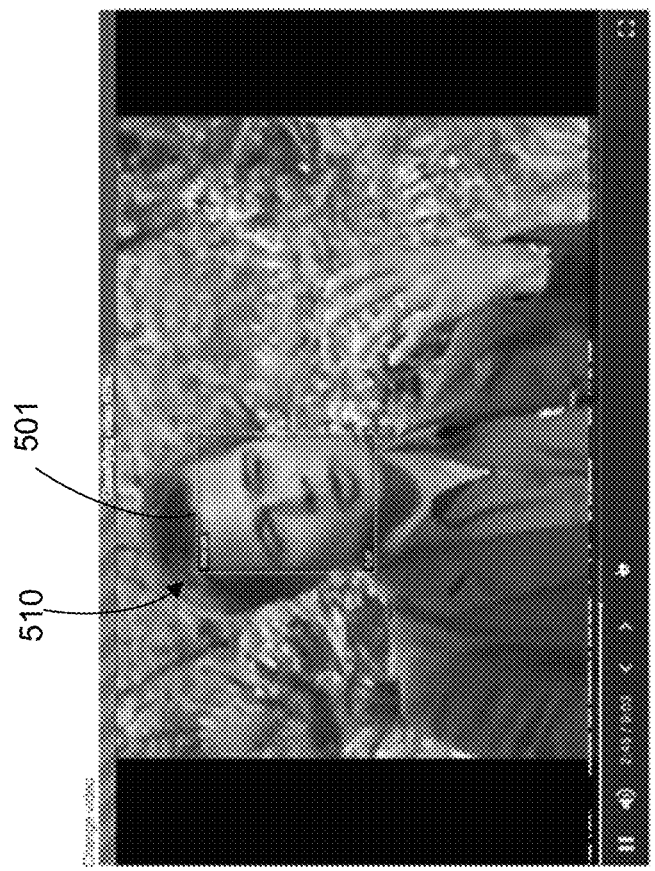

FIGS. 5A through 5D illustrate a user interface for highlighting searched content, according to one embodiment. As illustrated in FIG. 5A, the user interface 500 includes a display area 504 for presenting a search result determined to include the preferred content. In the illustrated example, the user configures to search for images of a celebrity's face. The user interface element 502 illustrates a progress of the search engine 148 searching for the preferred content in the video. The user interface element 503 illustrates temporal locations of the video that are determined to include the preferred content. The user interface element 503 is similar to the user interface element 209 described with respect to FIGS. 2A through 2C and description is omitted herein.

The search engine 148 determines that the image 510 of the individual's face is likely to be an image of the celebrity's face. The user interface element 501 is configured to highlight the region of the video frame that is determined to include the preferred content. The user interface element 501 is configured to be overlaid on top of the display area 504. Multiple user interface elements 501 can be overlaid on top of the display area 504 if the preferred content includes multiple objects (concepts or ideas). A user interface element is configured to highlight an identified object (concept or idea). The user interface module 150 configures the user interface element 501 according to the search engine's 148 output. In particular, a dimension and a position of the user interface element 501 is configured according to data associated with the identified object's (concept or idea) that is outputted by the search engine. The user interface element 501 may be further configured to present other information associated with the search such as a confidence score, a time point relative to the beginning of the video, a time stamp, a detector, and the like.

Figure 5C:
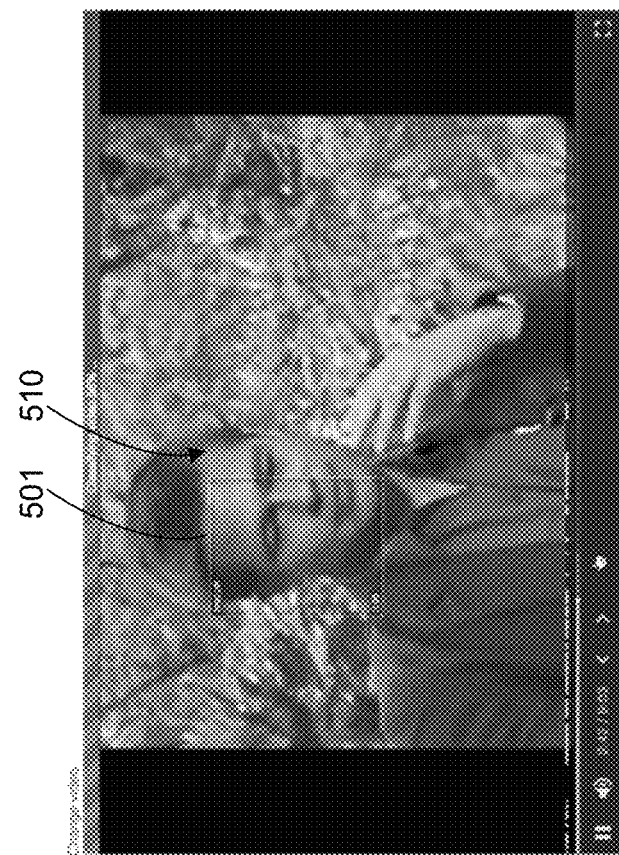

The user interface element 501 is configured to track the movement of the corresponding object (concept or idea) across consecutive video frames. As illustrated in FIGS. 5A through 5D, the user interface element 501 tracks the movement of the individual's face across the frames. In various embodiments, the user interface element 501 is configured to reduce an amount of sudden movement of the user interface element 501 between two consecutive video frames thereby to reduce visual disturbance. For example, for an identified object, the user interface module 150 determines an interpolation function using location data of the object outputted by the search engine 148. The user interface module 150 determines an interpolated location for the object on a particular video frame using the interpolation function. As illustrated in FIGS. 5A through 5D, the user interface element 501 tracks the movement of the individual's face. As illustrated in FIGS. 5A and 5C, the user interface element 501 does not entirely enclose the image 510 of the individual's face because on the locations of the user interface elements 501 are determined according to interpolated location data rather than raw location data.

Similar to the example interface 450 illustrated in FIG. 4D, the user interface element 501 is configured to receive user feedback for configuring detectors which is used for updating the detector. For example, the user interface element 501 is configured to receive user input including whether to use the image 510 of the individual's face as a positive example or as a negative example. The detector management module 152 receives the user input and includes the image 510 in the set of example media content items for updating the detector. The detector can be updated concurrently when the detector is employed by the search engine 148 to search for the celebrity's face (i.e., the preferred content).

Example User Interface for Presenting Analytics

FIGS. 6A through 6F illustrate example user interfaces for presenting analytics of a video stream, according to one or more embodiments. As previously described, the media detection system 140 generates analytics of a preferred content's appearance in a video stream. The video stream can be live. The media detection system 140 provides one or more user interfaces for presenting the analytics.

Figure 6A:
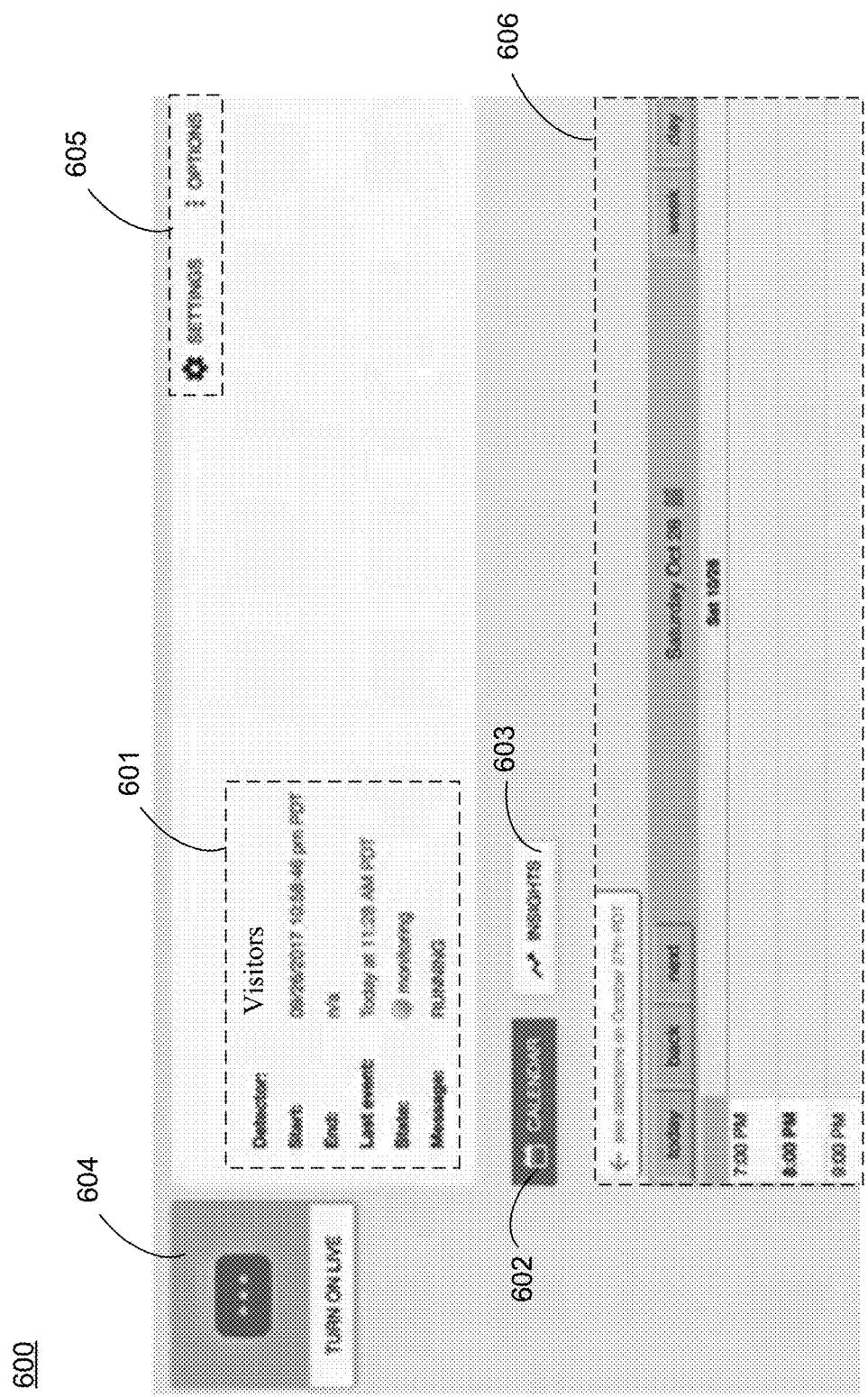
FIGS. 6A through 6E illustrate example user interfaces for presenting analytics of a video stream, according to one or more embodiments.

As illustrated in FIG. 6A, the user interface 600 is configured to present analytics and to receive user input. The user interface 600 allows users to configure and adjust the presentation of the analytics. The user interface 600 includes user interface elements 601 through 607. The user interface element 601 is configured to present background information of the monitoring such as a detector used to analyze a video stream, a starting time point of the analysis, an end time point of the analysis, a timestamp associated with a most recent event, a status (e.g., monitoring, paused, stopped, error) of the video source, and a status (e.g., monitoring, paused, stopped, error) of the analytics. The user interface elements 602 and 603 are configured to allow users to select a format of analytics to be presented. The user interface element 602 is configured to generate a signal if triggered that causes the user interface module 150 to provide a user interface that presents a particular type of analytics over a calendar. The user interface element 603 is configured to generate another signal if triggered that causes the user interface module 150 to provide a user interface that presents another type of analytics.

Figure 6B:
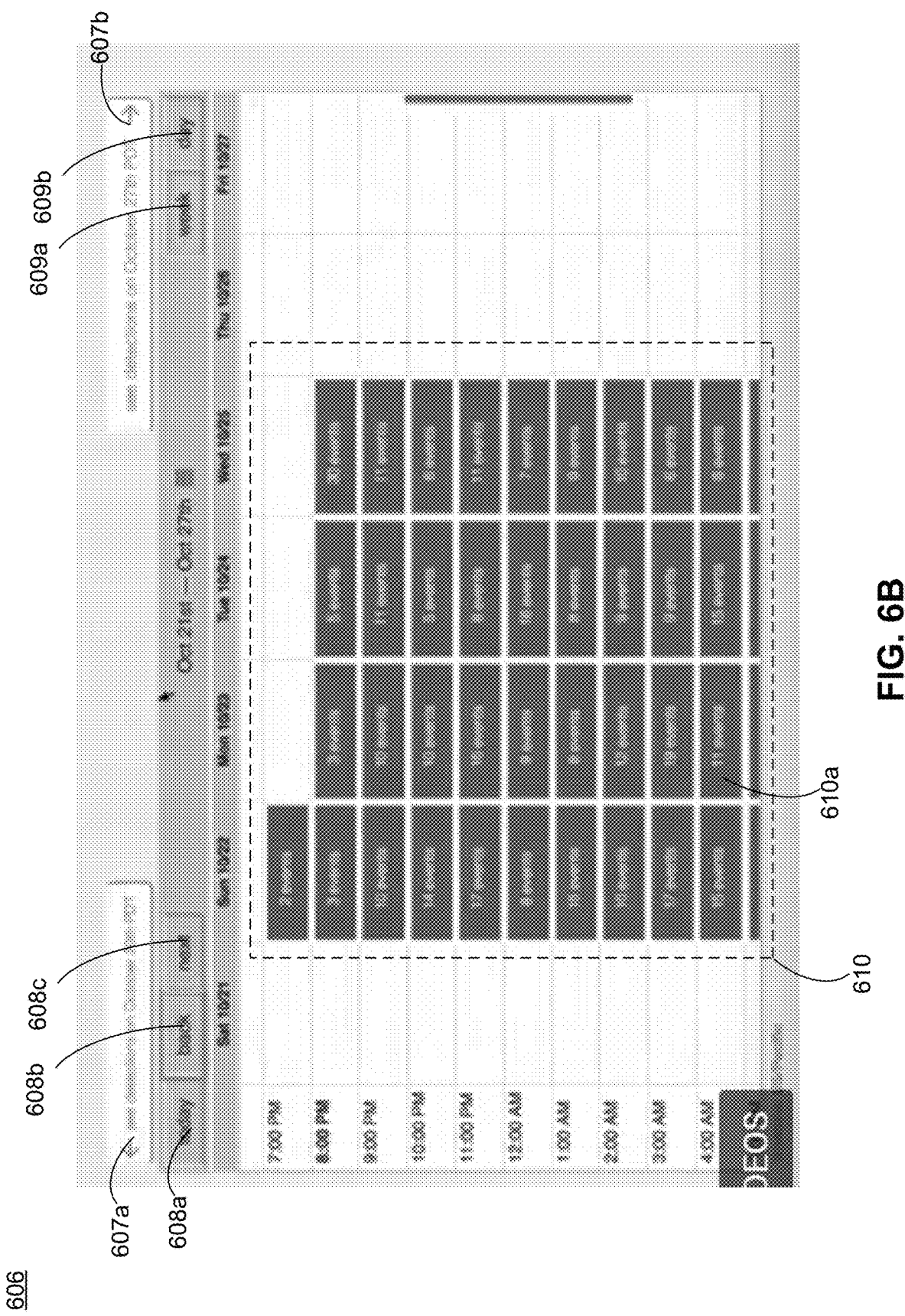

As illustrated, the user interface element 602 is actuated, and the user interface 606 is displayed. The user interface 606 is embedded in the user interface 600. Referring now to FIG. 6B, the user interface 606 includes user interface elements 607 through 610. The user interface elements 609 are configured to allow users to configure a number of days included in a calendar view. The calendar view illustrates time in a table where columns of the table correspond to days and rows of the table correspond to time intervals (e.g., hours) in a day. The user interface element 609a is configured to generate a signal to include 7 days in the calendar view if triggered and the user interface element 609b is configured to generate a signal to include 1 day in the calendar view if triggered.

The user interface elements 608 are configured to allow a user to navigate the calendar view. The user interface elements 608 are configured to generate a signal to include a particular time interval (e.g., a particular week, a particular day) in the calendar.

The user interface elements 610 are configured to illustrate events. An event represents a presence of a preferred content at a particular time. A particular user interface element 610 illustrates one or more particular events. For example, the user interface element 610a represents events between 4:00 AM and 5:00 AM on Monday October 23. The user interface elements 610 are configured such that they present analytics of events, for example, a total count of events in a particular time interval corresponding to a row as illustrated. The user interface elements 610 may be configured to be overlaid on top of or embedded in the calendar view. A user interface elements 610 is positioned to be aligned to a cell on the calendar view that corresponds to the specific time interval. The user interface elements 610 are further configured to allow users to review original footage of events. For example, if the user clicks on the user interface element 610a, a signal is generated to trigger the user interface module 150 to present footage of the events between 4:00 AM and 5:00 AM on Monday October 23.

The user interface elements 607 are configured to allow a user to navigate events. The user interface elements 607 are configured to generate a signal to include events in a particular time interval (e.g., a particular week, a particular day).

Figure 6C:
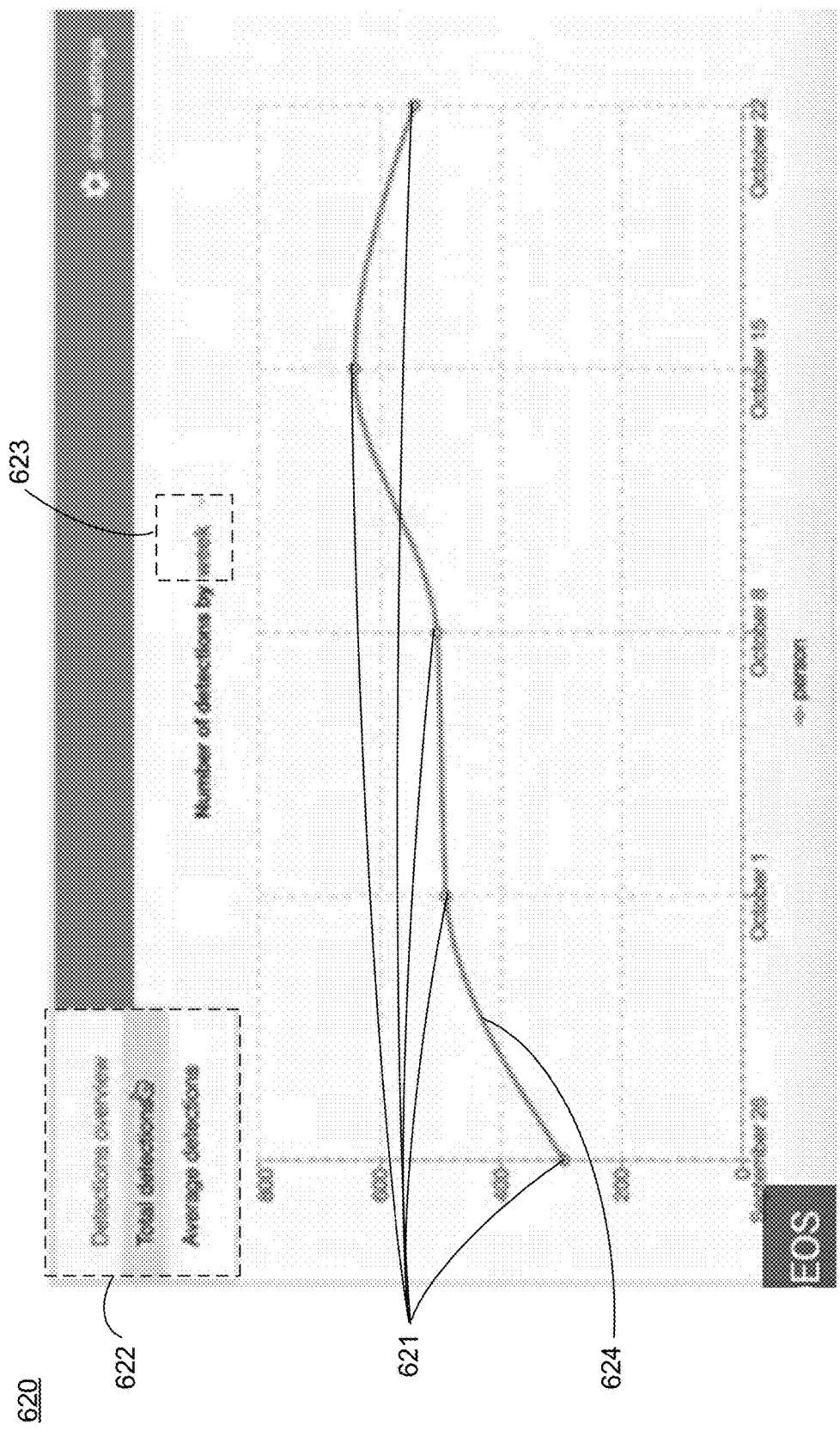
Figure 6D:
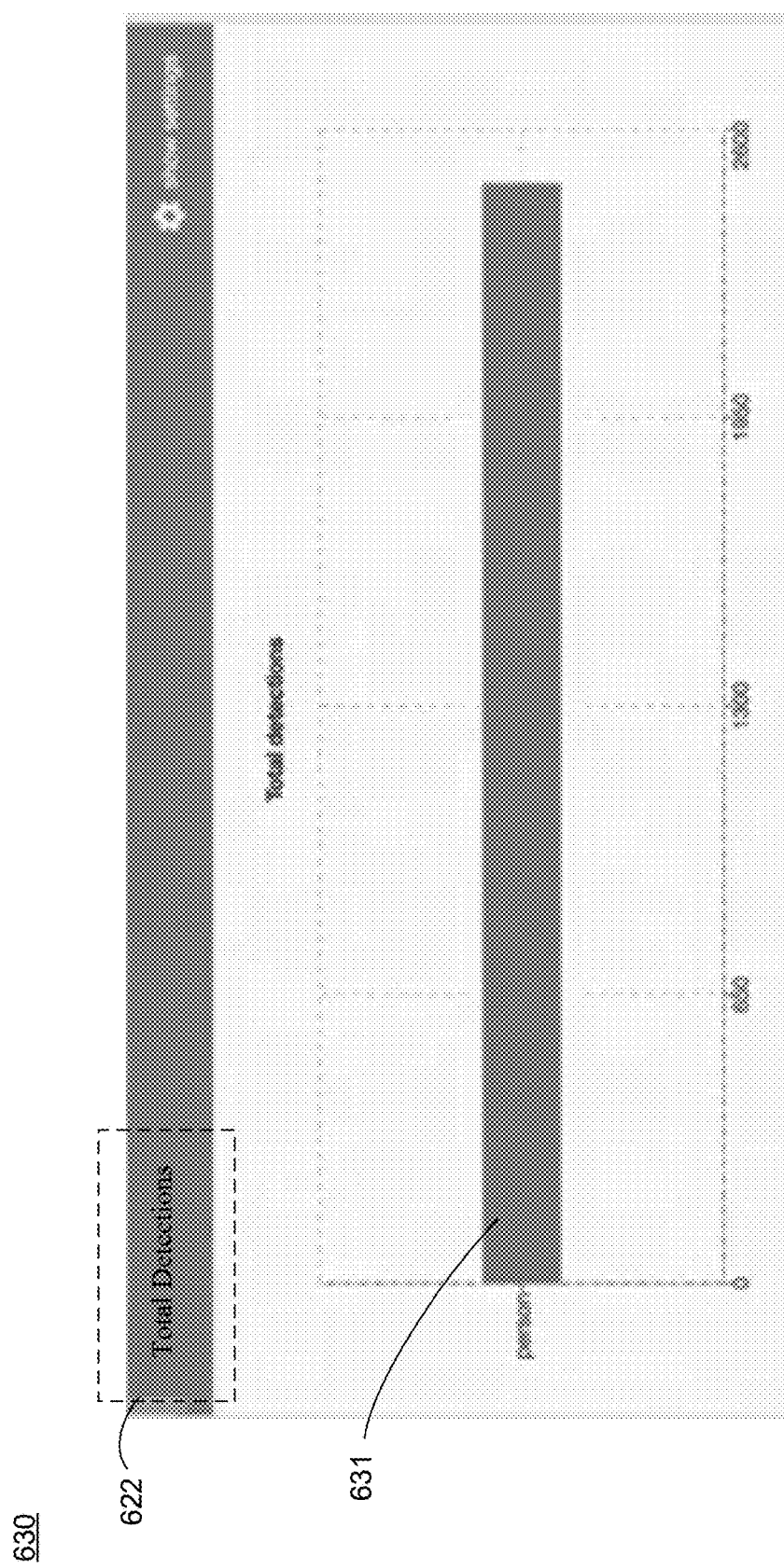
Figure 6E:
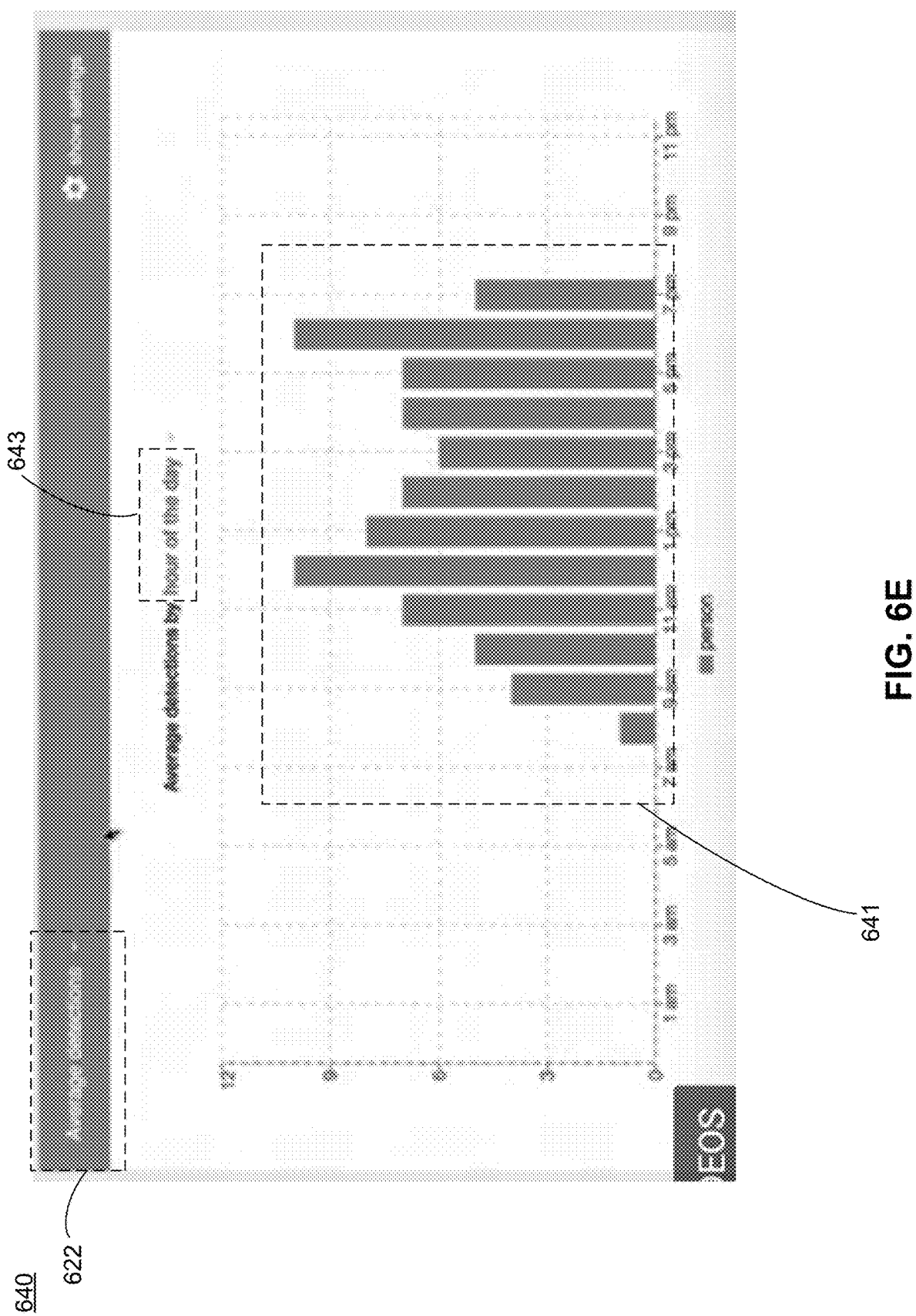

FIGS. 6C through 6E are described in connection with each other. The user interface element 622 illustrated in FIG. 6C is presented if the user interface element 603 illustrated in FIG. 6A is triggered. The user interface element 622 presents one or more types of analytics for users to select. In the illustrated example, the analytic types include a total count of events within a particular time interval, an accumulated count of events from a starting point, and an average count of events within a particular time interval.

The user interface 620 illustrated in FIG. 6C is configured to present a total count of events within a time interval (e.g., a week, two weeks, a month, three months). The user interface element 623 is configured to allow a user to specify the time interval for reviewing the total count of event. The user interface elements 621 are configured to illustrate the total counts of events for different time intervals. In the illustrated example, a trajectory 624 is constructed to connect the user interface elements 621 to illustrate the trend over time.

The user interface 630 illustrated in FIG. 6D is configured to present an accumulated count of events from a starting point (e.g., a beginning of a video stream that is being analyzed). The user interface element 631 (e.g., a bar) is configured to illustrate the accumulated count of events. The length of the user interface element 631 is determined according to the accumulated count. In the illustrated example, only one user interface element 631 is illustrated because the preferred content includes only one object (concept or idea). Multiple user interface elements 631 can be included in the user interface 630 to illustrate different objects in the preferred content. The multiple user interface elements 631 may be configured to be visually distinguished from each other. For example, the user interface elements 631 are of different colors, patterns, shades, and the like.

The user interface 640 illustrated in FIG. 6E is configured to present an average count of events within the time interval. The user interface element 643 is configured to allow a user to specify the time interval for reviewing the average count of events. The user interface elements (e.g., bars) 641 are configured to illustrate the average counts of events for different time intervals. The length of a user interface element 641 is determined according to the average count. In the illustrated example, only one user interface element 641 is illustrated for each time interval because the preferred content includes only one object (concept or idea). Multiple user interface elements 641 can be included in the user interface 630 in each time interval to illustrate different objects in the preferred content. The multiple user interface elements 641 may be configured to be visually distinguished from each other. For example, the user interface elements 641 are of different colors, patterns, shades, and the like.

Example Process Flow

Figure 7:
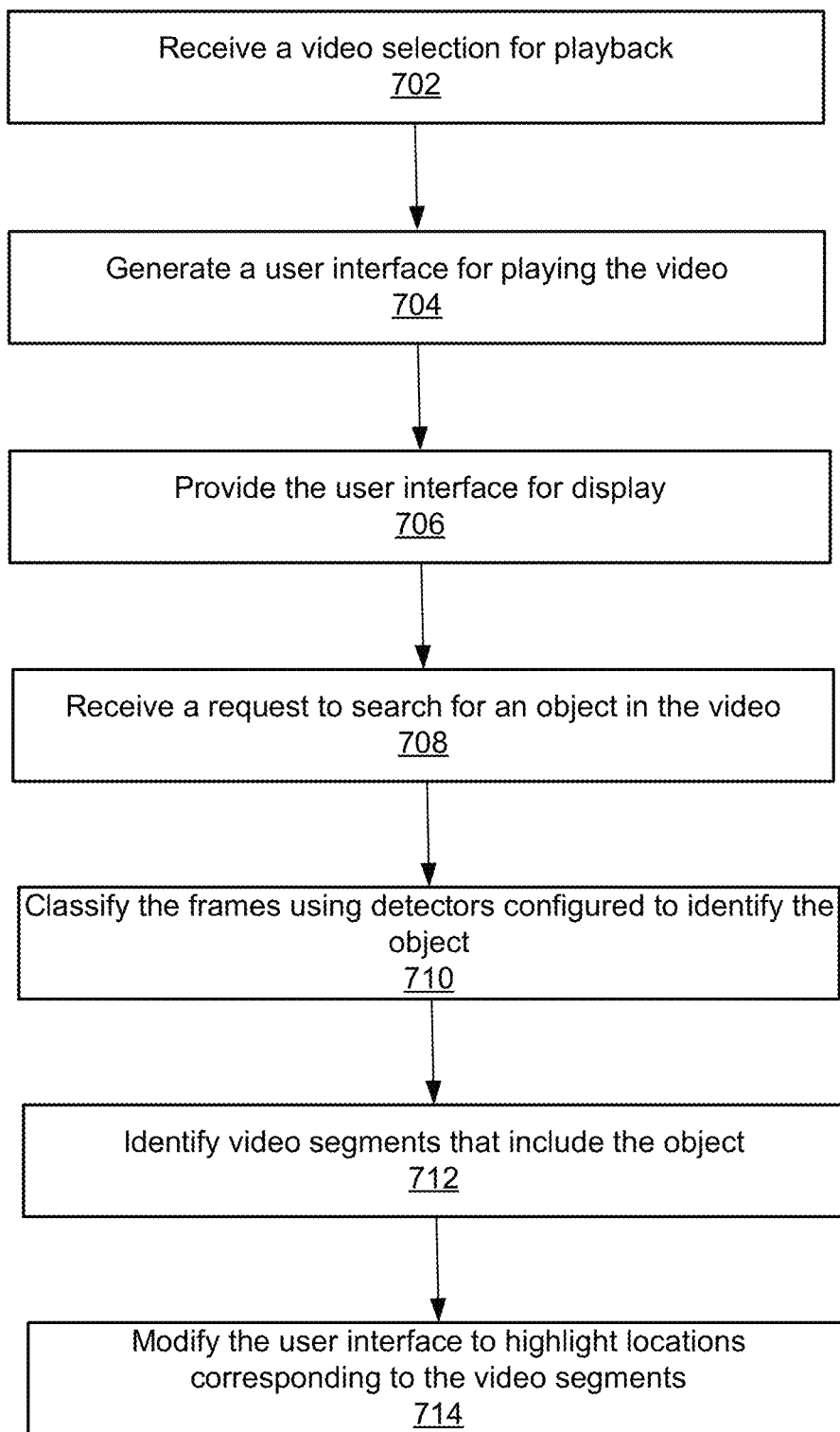
FIG. 7 is a flow chart of an example process of playing back a video, according to one embodiment.

FIG. 7 is a flow chart of an example process of playing back a video, according to one embodiment. The media detection system 140 receives 702 a selection of a video for playback from a user. The media detection system 140 generates 704 a user interface for playing the selected video. The user interface includes a progress bar interface element. A location within the progress bar interface element corresponds to a frame of the video. The media detection system 140 provides 706 the generated user interface to a client device associated with the user for display. The media detection system 140 receives 708 a request to search the selected video for a selected object from the user.

The media detection system 140 classifies 710 frames of the video using one or more detectors. A detector is configured to process the frame and output a confidence score indicating a likelihood that the selected object is present within the frame. In some embodiments, the media detection system 140 employs a plurality of detectors to classify a video frame. The media detection system 140 determines an average confidence score using the confidence scores classified by the plurality of detectors and associates the average confidence score with the frame. In some embodiments, the media detection system 140 monitors the displayed frame during playback, and provides the confidence score associated with the displayed frame for display in the user interface. The user interface includes a user interface element for displaying the confidence score.

The media detection system 140 identifies 712 one or more video segments based on the classification. A video segment comprises a set of consecutive frames associated with confidence scores greater than a threshold confidence score. In some embodiments, a video segment includes at least a minimum threshold number of frames. In some embodiments, the media detection system 140 determines a confidence score for a video segment by averaging confidence scores associated with the video frames included in the video segment. The media detection system 140 selects the video segments of which the associated confidence score is greater than a threshold confidence score. The video segment may include a video frame of which the associated confidence score is less than the threshold confidence score. The video segments may be identified dynamically according to the threshold confidence score input by the user. The user interface includes a user interface element configured to receive the threshold confidence score from the user.

The media detection system 140 modifies 714 the displayed progress bar interface element to highlight locations within the progress bar interface element that correspond to the identified one or more video segments. The progress bar interface element may be visually distinguished from the progress bar interface element. For example, the displayed progress bar interface element is in a first color, and the progress bar interface element is in a second color different from the first color. The media detection system 140 may modify the displayed progress bar interface element dynamically according to the threshold confidence score input by the user.

Figure 8:
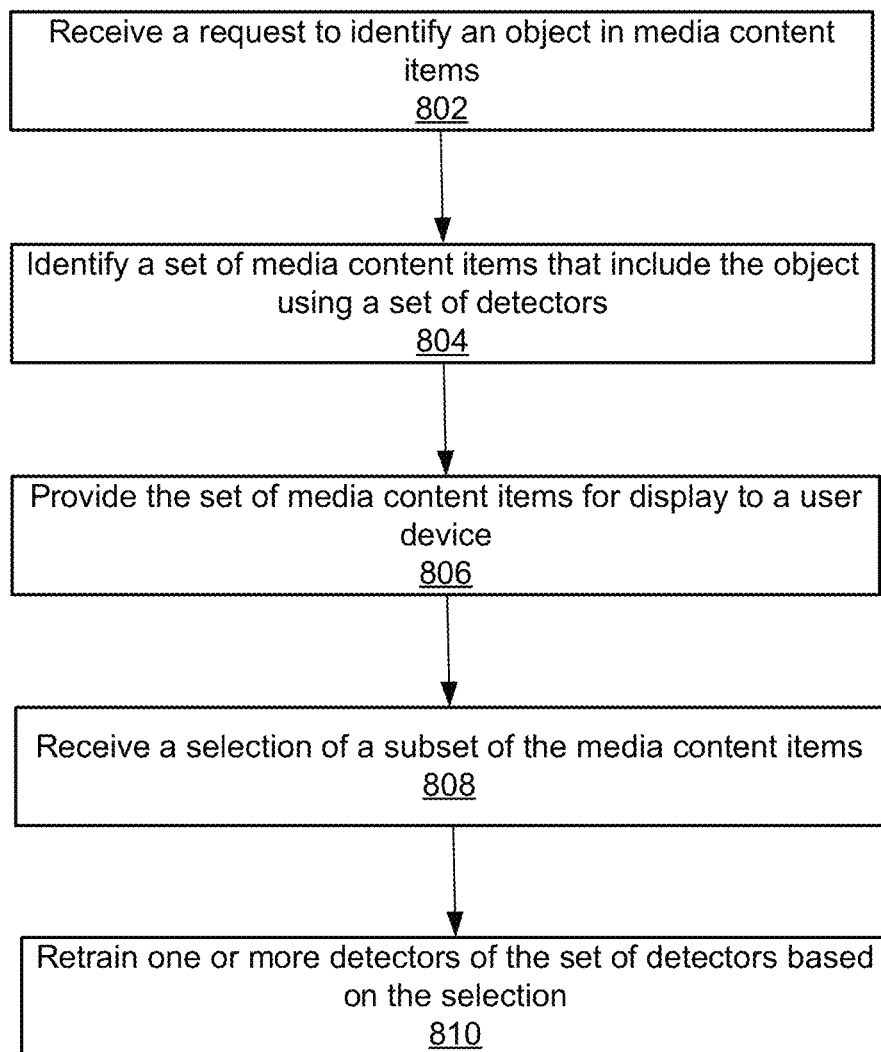
FIG. 8 is a flow chart of an example process of updating a detector, according to one embodiment.

FIG. 8 is a flow chart of an example process of updating a detector, according to one embodiment. The media detection system 140 receives 802 a request to identify a selected object in one or more media content items from a user device. The media detection system 140 identifies 804 a set of media content items that include the selected object from the one or more media content items. The media content items are identified by classifying the one or more media content items using a set of detectors configured to identify the selected object within media content items. The set of detectors are trained using a set of example media content items. The media detection system 140 may provide a user interface for users to select the set of example media content items from a plurality of media content items. In some embodiments, the example media content items are retrieved by performing an image search of an image database using keywords corresponding to the selected object. In some embodiments, the example media content items include examples of media content items that do not include the selected object.

The media detection system 140 provides 806 the identified set of media content items for display within a user interface on the user device. The media detection system 140 receives 808 a selection of a subset of the displayed media content items from the user device. The media detection system 140 retrains 810 one or more detectors of the set of detectors based on the selected subset of the displayed media content items. The media detection system 140 produces a modified set of example media content items to retrain the one or more detectors. For example, the media detection system 140 removes (or adds) the media content items of the received subset of displayed media content items from the set of example media content items. The received subset of the displayed media content items include examples of media content items that include the selected object.

Figure 9:
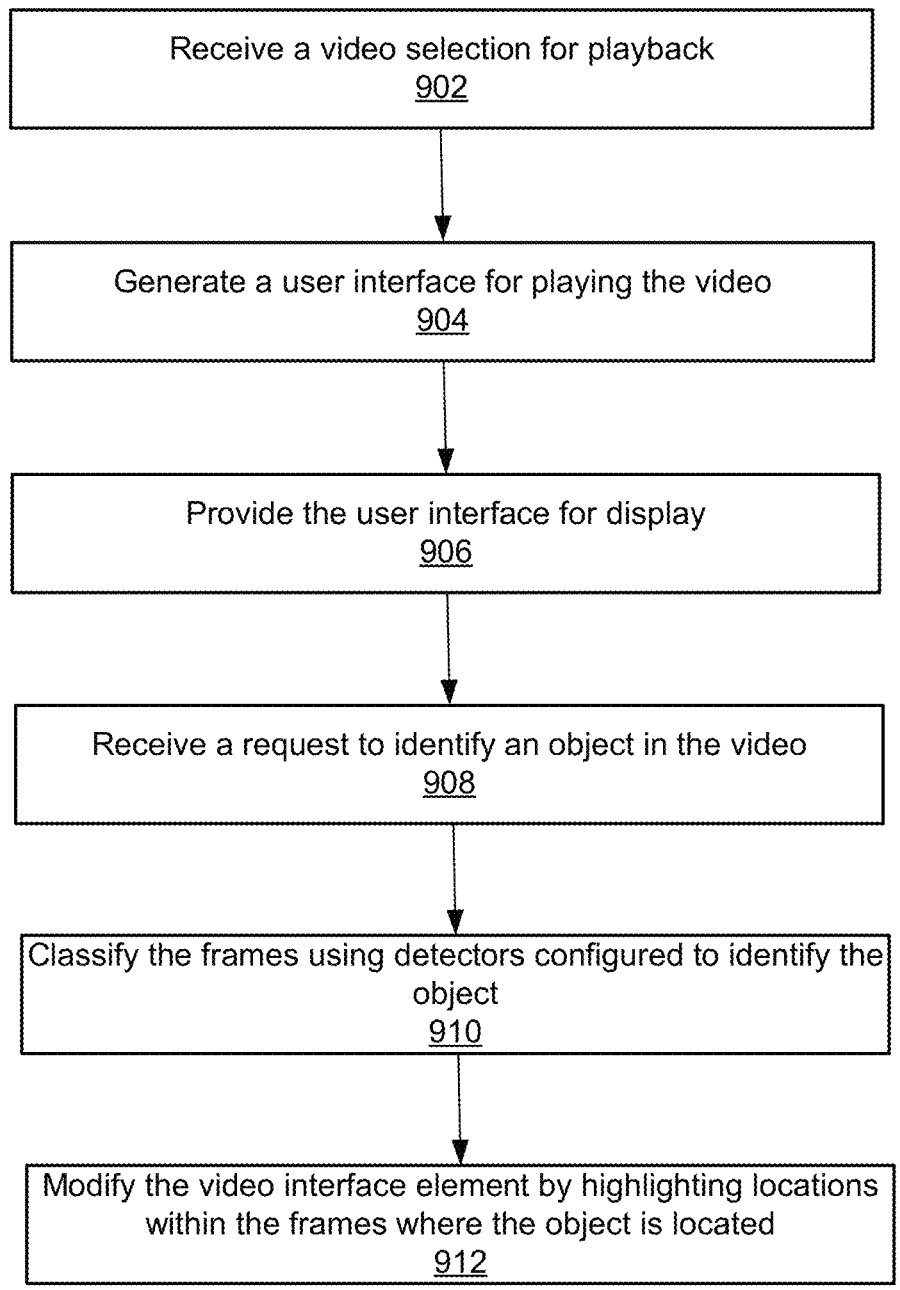
FIG. 9 is a flow chart of an example process of playing back a video, according to one embodiment.

FIG. 9 is a flow chart of an example process of playing back a video, according to one embodiment. The media detection system 140 receives 902 a selection of a video for playback from a user. The media detection system 140 generates 904 a user interface for playing the selected video. The user interface includes a user interface element for displaying the video frame. The media detection system 140 provides 906 the generated user interface to a client device associated with the user for display. The media detection system 140 receives 908 a request to search the selected video for a selected object from the user.

The media detection system 140 identifies 910 a set of frames of the selected video that include the selected object by classifying frames of the video using one or more detectors. A detector is configured to 1) identify a presence of the selected object within the frame, 2) determine an associated confidence score indicating a likelihood of the selected object being present within the frame, and 3) identify a location within the frame in which the selected object is located for frames associated with an above-threshold confidence score.

The media detection system 140 modifies 912 the video interface element displayed by the client device by highlighting the identified location within the frame in which the selected object is located. The highlighting may be formed for each frame of the identified set of frames displayed within the video interface element. For example, the media detection system 140 overlays one or more user interface elements on top of the video frame thereby to highlight an identified location within a frame in which the selected object is located. The one or more user interface elements include boundary boxes that surround the location within a frame in which the selected object is located. The one or more user interface elements are relocated each time a new frame of the selected video is displayed based on a change in location within the frame in which the selected object is located relative to a previous frame. In cases where a displayed frame includes multiple instances of the object, the media detection system 140 highlights each instance of the object.

The media detection system 140 may provide a feedback interface element on the client device that allows users to provide feedback. If receiving feedback via the feedback interface element indicating that a displayed frame with a highlighted identified location does not include the selected object, the media detection system 140 retrains one or more of the detectors employed based on feedback. In some embodiments, the media detection system 140 may provide for display on the client device a confidence interface element configured to display the confidence score associated with a video frame when the video frame is displayed.

Figure 10:
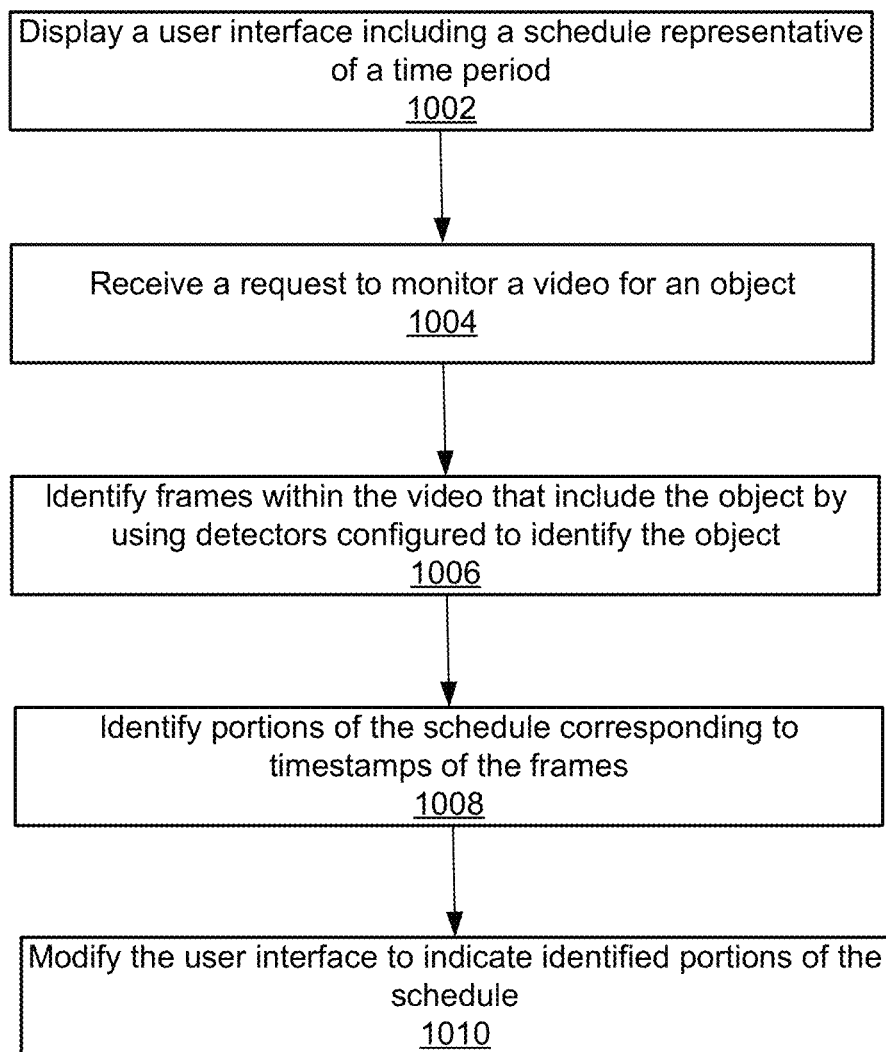
FIG. 10 is a flow chart of an example process of monitoring a video, according to one embodiment.

FIG. 10 is a flow chart of an example process of monitoring a video, according to one embodiment. The media detection system 140 interfaces 1002 with a client device that displays a user interface comprising a schedule representative of a period of time. The schedule is displayed as a set of time intervals within the period of time. The media detection system 140 highlights the time intervals within the set of time intervals that correspond to one or more timestamps of frames within the identified set of frames. A time interval includes one or more of: a day, an hour, an hour within a set of working hours, and a 10-minute interval.

The media detection system 140 receives 1004 a request to monitor a video for a selected object. The video includes video frames that each are associated with a timestamp. The media detection system 140 identifies 1006 a set of frames of the video that includes the selected object by. For each of a plurality of frames, the media detection system 140 classifies the frame using a set of detectors configured to output an associated confidence score indicating a likelihood that the frame includes the selected object. The identified set of frames includes frames associated with a confidence score greater than a threshold confidence score.

The media detection system 140 identifies 1008 portions of the schedule corresponding to one or more timestamps of frames within the identified set of frames. The media detection system 140 modifies 1010 the user interface displayed by the client device to indicate identified portions of the schedule. The media detection system 140 may indicate within a highlighted time interval a number of occurrences of the selected object within the frames of the identified set of frames associated with timestamps corresponding to the time interval. If the selected object includes a face of a selected person, the media detection system 140 modifies overlays text associated with an identity of the selected person on the portions of the schedule displayed within the user interface.

The media detection system 140 may receive a request from a user for a total amount of time within the video in which the selected object is included. The media detection system 140 displays within the second user interface element an amount of time corresponding to a sum of time associated with each identified portion of the schedule. The video may be a live video, and the media detection system 140 modifies the user interface displayed by the client device to indicate identified portions of the schedule in real-time.

Computer Architecture

Figure 11:
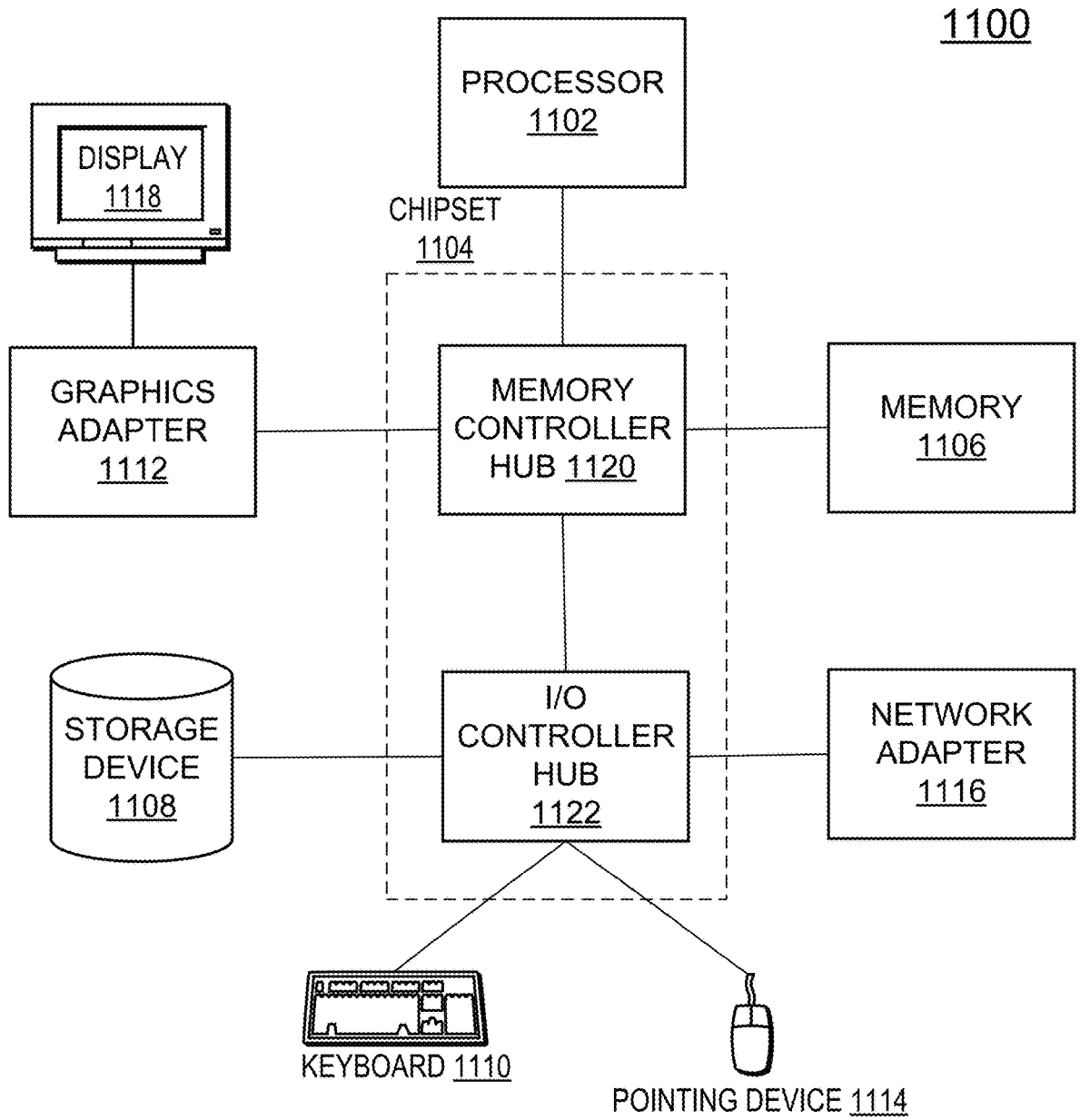
FIG. 11 is a high-level block diagram of a computer for implementing different entities illustrated in FIG. 1.

FIG. 11 is a high-level block diagram of a computer 1100 for implementing different entities illustrated in FIG. 1. The computer 1100 includes at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is any non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer system 1100. The graphics adapter 1112 displays images and other information on the display 1118. The network adapter 1116 couples the computer system 1100 to the network 150.

As is known in the art, a computer 1100 can have different and/or other components than those shown in FIG. 11. In addition, the computer 1100 can lack certain illustrated components. For example, the computer acting as the online system 100 can be formed of multiple blade servers linked together into one or more distributed systems and lack components such as keyboards and displays. Moreover, the storage device 1108 can be local and/or remote from the computer 1100 (such as embodied within a storage area network (SAN)).

As is known in the art, the computer 1100 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1108, loaded into the memory 1106, and executed by the processor 1102.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative designs for a unified communication interface providing various communication services. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

The invention claimed is:

1. A computer-implemented method, comprising:
receiving, from a user, a search query identifying an object;
classifying frames of a video using one or more detectors configured to, for each frame of the video, process the frame and output a confidence score indicating a likelihood that the identified object is present within the frame;
identifying a first set of video segments and a second set of video segments based on the classification, each video segment in the first set of video segments comprising a set of consecutive frames associated with confidence scores greater than a first threshold confidence score and each video segment in the second set of video segments comprising a set of consecutive frames associated with confidence scores greater than a second threshold confidence score; and
modifying a progress bar interface element comprising a first color to display highlighted locations within the progress bar interface element that correspond to the first set of video segments in a second color different from the first color and that correspond to the second set of video segments in a third color different from the first and second colors.

2. The method of claim 1, wherein the one or more detectors comprise a plurality of detectors, and wherein the confidence score associated with the frame classified by the plurality of detectors comprises an average of confidence scores outputted by the plurality of detectors in response to processing the frame.

3. The method of claim 1, wherein each video segment in the first set of video segments and the second set of video segments comprises at least a threshold number of consecutive frames.

4. The method of claim 1, wherein an average confidence score of the set of consecutive frames of a video segment in the first set of video segments is greater than the first threshold confidence score, and wherein at least one confidence score associated with a frame of the set of consecutive frames of the video segment is below the first threshold confidence score.

5. The method of claim 1, wherein the first threshold confidence score and the second threshold confidence score are received from the user.

6. The method of claim 1, further comprising:
monitoring a displayed frame of the video during playback of the video; and
providing the confidence score associated with the displayed frame for display.

7. A non-transitory computer-readable storage medium storing executable instructions that, when executed by a hardware processor, cause the hardware processor to perform steps comprising:
receiving, from a user, a search query identifying an object;
classifying frames of a video using one or more detectors configured to, for each frame of the video, process the frame and output a confidence score indicating a likelihood that the identified object is present within the frame;
identifying a first set of video segments and a second set of video segments based on the classification, each video segment in the first set of video segments comprising a set of consecutive frames associated with confidence scores greater than a first threshold confidence score and each video segment in the second set of video segments comprising a set of consecutive frames associated with confidence scores greater than a second threshold confidence score; and
modifying a progress bar interface element comprising a first color to display highlighted locations within the progress bar interface element that correspond to the first set of video segments in a second color different from the first color and that correspond to the second set of video segments in a third color different from the first and second colors.

8. The non-transitory computer-readable storage medium of claim 7, wherein the one or more detectors comprise a plurality of detectors, and wherein the confidence score associated with the frame classified by the plurality of detectors comprises an average of confidence scores outputted by the plurality of detectors in response to processing the frame.

9. The non-transitory computer-readable storage medium of claim 7, wherein each video segment in the first set of video segments and the second set of video segments comprises at least a threshold number of consecutive frames.

10. The non-transitory computer-readable storage medium of claim 7, wherein an average confidence score of the set of consecutive frames of a video segment in the first set of video segments is greater than the first threshold confidence score, and wherein at least one confidence score associated with a frame of the set of consecutive frames of the video segment is below the first threshold confidence score.

11. The non-transitory computer-readable storage medium of claim 7, wherein the first threshold confidence score and the second threshold confidence score are received from the user.

12. The non-transitory computer-readable storage medium of claim 7, wherein the instructions, when executed by the hardware processor, cause the hardware processor to perform further steps comprising:
monitoring a displayed frame of the video during playback of the video; and providing the confidence score associated with the displayed frame for display.

13. A system, comprising:
a computer processor; and
a non-transitory memory storing executable computer instructions that when executed by the computer processor are configured to cause the computer processor to perform steps comprising:
receiving, from a user, a search query identifying an object;
classifying frames of a video using one or more detectors configured to, for each frame of the video, process the frame and output a confidence score indicating a likelihood that the identified object is present within the frame;
identifying a first set of video segments and a second set of video segments based on the classification, each video segment in the first set of video segments comprising a set of consecutive frames associated with confidence scores greater than a first threshold confidence score and each video segment in the second set of video segments comprising a set of consecutive frames associated with confidence scores greater than a second threshold confidence score; and
modifying a progress bar interface element comprising a first color to display highlighted locations within the progress bar interface element that correspond to the first set of video segments in a second color different from the first color and that correspond to the second set of video segments in a third color different from the first and second colors.

14. The system of claim 13, wherein the one or more detectors comprise a plurality of detectors, and wherein the confidence score associated with the frame classified by the plurality of detectors comprises an average of confidence scores outputted by the plurality of detectors in response to processing the frame.

15. The system of claim 13, wherein each video segment in the first set of video segments and the second set of video segments comprises at least a threshold number of consecutive frames.

16. The system of claim 13, wherein an average confidence score of the set of consecutive frames of a video segment in the first set of video segments is greater than the first threshold confidence score, and wherein at least one confidence score associated with a frame of the set of consecutive frames of the video segment is below the first threshold confidence score.

17. The system of claim 13, wherein the first threshold confidence score and the second threshold confidence score are received from the user.

* * * * *